United States Patent [19]

Wakasugi

[11] Patent Number: 5,428,892
[45] Date of Patent: Jul. 4, 1995

[54] METHOD OF MANUFACTURING A COMBINED TUNNEL ERASE HEAD

[75] Inventor: Makoto Wakasugi, Tokorozawa, Japan

[73] Assignee: Citizen Watch Co., Inc., Tokyo, Japan

[21] Appl. No.: 114,952

[22] Filed: Aug. 31, 1993

[30] Foreign Application Priority Data

Sep. 1, 1992 [JP] Japan .................. 4-255434
Jan. 22, 1993 [JP] Japan .................. 5-26005
Apr. 2, 1993 [JP] Japan .................. 5-98385

[51] Int. Cl.6 .................................. G11B 5/42
[52] U.S. Cl. ........................... 29/603; 360/118
[58] Field of Search ........... 29/603; 360/118–121, 360/125–127

[56] References Cited

FOREIGN PATENT DOCUMENTS 2-47002  8/1985  Japan .
1196714  8/1989  Japan .
3-11002  2/1991  Japan .

Primary Examiner—Carl E. Hall
Attorney, Agent, or Firm—Spensley Horn Jubas & Lubitz

[57] ABSTRACT

In a method of manufacturing a tunnel erase type combined magnetic head core using a first core member having a predetermined pole height dimension defined by a surface on a magnetic gap formation side and an apex, and a predetermined back height dimension defined by the apex and a bottom of a coil core into which a coil is inserted, and a second core member, the bottom of the coil core of the first core member is used as a back height reference face and the combined magnetic head core is manufactured with the back height reference face as reference, thereby facilitating processing of a surface on the pole height side at intermediate steps, namely, a final contact face with which magnetic recording media are brought into contact. Since the back height reference face is used as reference, when combined core chips are incorporated into sliders to manufacture magnetic heads, the process is not affected by variations in core dimensions.

16 Claims, 33 Drawing Sheets

METHOD OF MANUFACTURING A COMBINED TUNNEL ERASE HEAD

BACKGROUND OF THE INVENTION

1. Field of the Invention

This invention relates to a combined magnetic head core and a manufacturing method therefor and more particularly to a combined magnetic head core made up of a pair of a record/reproduce cores and an erase core for use with a device, such as a floppy disk drive, and a manufacturing method therefor.

2. Description of the Related Art

Hitherto, a ferrite core formed using ferrite as core material has been known as a magnetic head core. The ferrite core generally has a ring form made up of a pair of ferrite members, whereby a ring magnetic path (magnetic circuit) is formed. A predetermined magnetic gap is provided between the opposite ferrite members in the direction crossing the magnetic path. By the use of a magnetic gap, predetermined recording and reproducing are performed on magnetic recording media such as a magnetic disk by bringing the outer face of the ferrite members, between which the magnetic gap is formed, into contact with the magnetic recording medium. A space is formed between the paired ferrite members and is used as a hole for coil winding.

In addition to using such a single ferrite core as a magnetic head core, there may be a combined magnetic head core into which the two ferrite cores are integrated, one example of which is shown in Japanese Patent Laid-Open Nos. Hei 2-47002 and 3-11002. FIG. 1 is a perspective view of a combined magnetic head having a conventional combined magnetic head core structure. FIG. 2 is a perspective view of the conventional combined magnetic head core structure.

The conventional combined magnetic head 18 consists mainly of a combined magnetic head core 10, a slider 16, two coil assemblies (not shown), and two back cores (not shown). The combined magnetic head core 10 comprises a record/reproduce core (read/write core: R/W core) 12 and an erase core (E core) 14. The R/W core 12 has an outer core section 20 and an inner core section 22. The outer core section 20 is made of a ferrite member whose side is formed like an L letter; it consists of a contact area 20a with which magnetic recording media are brought into contact in the upper right of FIG. 2 and a coil core 20b inserted into an insertion hole of the slider 16. The inner core section 22 is made of a ferrite member whose side is formed like a letter "I" letter; it has a contact area 22a with which magnetic recording media are brought into contact in the upper center of FIG. 2, like the outer core section 20. The outer core section 20 and the inner core section 22 form a magnetic gap (read/write gap) 30 between the contact areas 20a and 22a. A read/write track 32 for recording and reproducing data on and from magnetic recording media is formed in the contact areas 20a and 22a.

The read/write track 32 is determined so that it has a predetermined width (w) according to the type of magnetic recording medium with which it is brought into contact. The track width is defined by track definition grooves 34 formed in both magnetic path sides of the magnetic gap 30, namely, formed in both sides of the magnetic path in the axial direction of the contact areas 20a and 22a. The track definition grooves 34 are tilt grooves formed across both the contact areas 20a and 22a.

The erase core 14 has an outer core section 36 and an inner core section 38. The outer core section 36 is made of a ferrite member whose side is formed like a letter "L"; it consists of a contact area 36a and a coil core 36b. The inner core section 38 is made of a ferrite member whose side is formed like a letter "I"; it has a contact area 38a with which magnetic recording media are brought into contact in the upper center of FIG. 2. The outer core section 36 and the inner core section 38 form two magnetic gaps (erase gaps) 40 between the contact areas 36a and 38a. Tilt track definition grooves 42a and 42b are formed in the surface of the contact areas 36a and 38a, across the contact areas 36a and 38a, in the center and in both sides of the magnetic path of the contact areas 36a and 38a. The magnetic path of the contact area 36a formed in the left and right of the track definition groove 42a forms erase tracks 44.

The inner core sections 22 and 38 of the record/reproduce core 12 and the erase core 14 are located back to back with a predetermined gap. The gap between the inner core sections 22 and 38, the track definition grooves 34, 42a, and 42b, and the magnetic gaps 30 and 40 are filled with glass 46 to protect the read/write track 32 and the erase track 44.

A method of manufacturing the conventional combined magnetic head core comprises the steps of "surface groove processing of a first core member (U bar blank) and deposition of a second core member (I bar blank)," "first glass bonding (first GB)," "first GB finishing," "track definition groove processing on record-/reproduce core," "track definition groove processing on erase core," "second glass bonding (second GB)," "second GB top processing," "coil groove processing," and "core cutting and core chip preparation."

The method is described in conjunction with FIGS. 3 and 4. First, in FIG. 3, with a surface 50a on the side of incomplete dimension (pole height (PH)) of magnetic gap depth of a U bar 50, a first core member made of ferrite, etc., whose section perpendicular to the length of it is formed substantially like a letter U as processing reference, an opposite face 52 is processed and the full width of U bar blank is set. The PH dimension of the U bar 50 is defined by the magnetic gap formation surface and the apex (AP), and the back height (BH) dimension is defined by the AP and the bottom of coil core 50b. Generally, the U bar 50 and an I bar 54, a second core member made of ferrite, etc., whose section perpendicular to the length of it is formed substantially like a letter I are set as having the same width (W in FIG. 3). With, as reference, the surface 50a on the PH side of a combined core structure, into which two core blanks subjected to first glass bonding by aligning the surface 50a on the PH side of the U bar 50 and one face of the I bar 54 are integrated by second glass bonding, the opposite face 52 to the PH side is processed and the combined core structure is cut to a predetermined thickness to provide combined core chips 56. This BH becomes complete BH. Therefore, for the U bar 50, high precision is required for the PH although the BH at the blank time may be low in precision.

Next, in FIG. 4, when the combined core chips 56 are bonded to the sliders 16, if faces 16a on the magnetic recording medium contact side of the sliders 16 are aligned on the side reference of the PH side of the combined core chips 56 for bonding, the lower faces 16b of the sliders 16 and the surfaces 10 on the BH side of the core chips 56 do not align due to the dimension difference between the sliders 16 and the core chips 56. To process the faces 16a on the magnetic recording medium contact side of the sliders 16 as shown in FIG. 4, even if the PHs of the core chips 56 are precise, if the heights of the sliders 16 vary in precision, the height difference B between the sliders 16 occurs. Since a plurality of pieces are processed at the same time with the lower faces 16b of the sliders 16 as reference, gap depth (GD) precision becomes bad. Therefore, height precision of the sliders 16, although not essentially necessary, is extremely strict; for example, a to levance of about: 2 μm is required. As described above, the width of the U bar 50 is set to the same as that of the I bar 54 because it is difficult to provide a predetermined difference, such as about 100 μm, between them. If a processing method on surface reference on the BH side described below is not adopted, processing precision of the U bar 50 and the I bar 54, variations depending on deformation of blanks of both bars, and variations in set of glass bonding of both bars are involved and a predetermined difference, such as about 100 μm, cannot be guaranteed. To consider the variations, if the U bar 50 and the I bar 54 are made having different in widths, the difference must be set to a larger value than the predetermined difference. When coils and back cores are incorporated to form a magnetic head in post processing, the larger setup difference affects the contact area of the back core; when the contact area is small, magnetic resistance becomes large, resulting in degradation of the electromagnetic conversion characteristic of the head. Therefore, the U and I bars have been set to the same width.

However, in such a manufacturing method, processing is performed with the surface on the PH side of the U bar 50 as reference as described above, thus the number of steps in processing the surface on the BH side increases and extremely strict height precision of the sliders 16 and extremely strict PH precision of the U bar 50 is required, raising manufacturing costs. On the other hand, GD precision is lowered due to variation in height precision of the sliders 16, and the electro-magnetic conversion characteristic is degraded.

Formerly, track definition groove processing of the record/reproduce core 12 and that of the erase core 14 were performed in separate batches because the track definition grooves 34 and 42a and 42b differ in pitch. In track definition groove processing of the record/reproduce core 12 and that of the erase core 14, as shown in FIG. 5, a core blank 60 of either of the record/reproduce core 12 or the erase core 14 was set on a jig 62 which was set on a work table 64. By moving a blade 66 back and forth in the direction Y and the vertical direction Z and moving the work table 64 in the horizontal direction X, a large number of track definition grooves 34 were cut in the length of the core blank 60R/W of the record/reproduce core 12; a large number of track definition grooves 42a and 42b were cut in the length of the core blank 60E of the erase core 14.

In cutting track definition grooves 34, 42a, and 42b of core blanks 60 of the record/reproduce core 12 and the erase core 14, the relationship between the number of core blanks 60R/W of the record/reproduce cores 12 and a cumulative pitch error is shown as curve R/W in FIG. 6; the relationship between the number of core blanks 60E of the erase cores 14 and a cumulative pitch error is shown as curve E in FIG. 6. The curves R/W and E are not the same because the processing conditions do not match and the processing time is prolonged as described above. As the processing time is prolonged, air and grinding lubricant temperatures of a pneumatic spindle 68 of the dicing saw change and the spindle 68 may therefore expand or contract.

Assume that the feed rate of a core blank (GB bar) 60R/W of the record/reproduce core 12 is 5 mm/sec and that of a core blank 60E of the erase core 14 is 2 mm/sec and that the core blank length is 100 mm. With pitch P as 600 μm, two grooves are cut per pitch for the core blank 60R/W of the record/reproduce core 12. The number of grooves is 100,000÷600×2=333 grooves→330 grooves Three grooves are cut per pitch for the core blank 60E of the erase core 14. The number of grooves is 100,000÷600×3=499 grooves→495 grooves Assume that the X axis feed width of the move shaft of the work table 64 which is at right angles to the rotation shaft (spindle 68) of the blade 66 of the dicing saw is 200 mm as shown in FIG. 7. If core blanks 60 are arranged on 4-mm pitches, then 200÷4=50 core blanks are arranged. The cutting time per groove of the 50 core blanks 60 requires 200 mm÷5 mm/sec=40 sec for the core blanks 60R/W of the record/reproduce cores 12;

200 mm÷2 mm/sec=100 sec for the core blanks 60E of the erase cores 14.

Therefore, the total processing time for 50 core blanks 60 (8250 core chips) is

40×330=13200 sec=220 min=4 hr for the core blanks 60R/W of the record/reproduce cores 12;

100×495=49500 sec=825 min=14 hr for the core blanks 60E of the erase cores 14. If the return time of the blade 66 of the dicing saw is contained, the total processing time takes 5 hr for the core blanks 60R/W of the record/reproduce cores 12 and 15 hr for the core blanks 60E of the erase cores 14.

The blade 66 is attached to the pneumatic spindle 68 of the dicing saw, and the spindle 68 air and grinding lubricant temperatures change with time, expanding or contracting the spindle 68.

Assume that the temperature changes 5° C. for 5 to 15 hr, the time taken to process 50 core blanks 60R/W or 60E. If the overhang amount from the Y axis measurement position of the spindle 68 is 200 mm, 200,000 μm×5° C.×100×10$^{-7}$ (line expansion coefficient)=10 μm A pitch error occurs even if Y axis pitch feed precision is improved.

If the core blanks 60R/W and 60E are long, they extend over a large number of pitches, thus 1-pitch errors are accumulated, thereby increasing pitch shift as the pitches are placed backward.

As described above, if the track definition grooves 34, 42a, and 42b of the record/reproduce core 12 and the erase core 14 are cut separately, even when the track definition grooves 34 of the record/reproduce core 12 are cut on small pitches, the track definition grooves 42a and 42b of the erase core 14 become large or vice versa.

Therefore, if a combined magnetic head core is manufactured by joining the inner core section 22 of the record/reproduce core 12 and the inner core section 38 of the erase core 14, center line T1 of the record/reproduce core 12 does not match center line T2 of the erase core 14 as shown in FIG. 8, and if a misalignment between the center line T1 of the record/reproduce core 12 and the center line T2 of the erase core 14 exceeds the allowable range of 4 μm, an adjacent track erases a record and the actual recording track width is narrowed.

Since 1-pitch errors are accumulated as described above, track groove processing cannot be performed for a long (30 mm or longer) ferrite core structure, hindering efficient manufacturing of combined magnetic head cores.

Further, a guide to the unformatted recording capacity of a 3.5-inch floppy disk drive is 2M bytes. The magnetic head used for 2M-byte floppy disks is of tunnel erase type. For the erase characteristic of the head, the actual capability of the product is sufficiently superior to the specification. For example, for sweep track erase (STE), the specification is −28 dB while the actual capability is −40 dB.

However, for the read/write (R/W) characteristic, the actual capability of the product is not sufficiently superior to the specification. Particularly for Sidel, for example, for 2F output, the specification is 1.3 mVpp or more while the actual capability is about 1.5 mVpp (nominal); for overwrite (OW), the specification is −28 dB while the actual capability is about −30 dB; for resolution (Res), the specification is 70% or more while the actual capability is about 75%.

Further, the OW and Res specifications must be satisfied for disks manufactured by various manufacturers and the read/write characteristic of the magnetic head must be even as consistent as possible.

The read/write characteristic varies depending on the degree of loss in record/reproduce core 12 and the degree of loss occurring between the core 12 and a disk. To make the magnitude of the former loss even, it is important to make magnetic resistance of the record/reproduce core 12 even.

FIG. 9 is a front view of a core structure for illustrating magnetic resistance of a core made of ferrite, etc. FIG. 10 is a side view of the core structure in FIG. 9. In FIGS. 9 and 10, the magnetomotive force of the core, inductance (L), is inversely proportional to magnetic resistance of the core and proportional to the square of the number of coil turns, N.

$$L = k \quad (1)$$

$$R = Ri = Rg + Rc + Rbg \quad (2)$$

where
Rg is magnetic resistance of magnetic gap 30;
Rc is magnetic resistance of core (outer core section 20, inner core section 22, back core section); and
Rbg is magnetic resistance of back gap 30a.

The magnetic resistance Rc changes with a change in the track definition groove depth. Particularly, the inner core section 22 has large magnetic resistance, thus it is desirable to make the track definition groove depths as shallow and even as possible.

FIG. 11 is a front view of a core blank with dimension indication to calculate the BH dimension and the grooving height.

In this case, since the workpiece touch face of the jig 62, which is the reference face, is inclined, the height precision of the jig 62 is bad, therefore the precision of the C dimension becomes bad; the C dimension must be made large. Thus, the magnetic resistance R becomes large. As compared with horizontal track definition grooves, inclined track definition grooves 34 are cut deeper in the inner core section, thus the magnetic resistance R becomes larger, but the ferrite member of the inner core section 22 is originally thin and the magnetic resistance R is large; it is not preferable to increase the magnetic resistance R.

FIG. 12 is an illustration of a gap disconnection section in a core structure. With the inclined track definition groove 34 as shown in FIG. 12, reflected light does not come into view, thus the gap disconnection section dimension Q is not seen.

With the conventional record/reproduce core 12, only the track definition grooves 34 are filled with glass 46 and other portions of the contact area 20a remain with the ferrite member intact. The ferrite part may be broken off, causing signal read noise to occur. It is necessary to work so as not to break off the ferrite part. This makes it impossible to raise the work speed.

FIGS. 13, 14, and 15 are sectional views showing the state of the contact face taken on lines I-I', II-II', and III-III' of FIG. 1 respectively . At the conventional combined magnetic head core 10, on the section taken on line I-I' of the record/reproduce core 12, an aqueous solution is used for lapping in the manufacturing process. Thus, as shown in FIG. 13, high melting point glass portions a at the left and right of a read/write track 32 in the inner core section 22 of the record/reproduce core 12 are recessed about 0.02 μm and low melting point glass portions b are recessed 0.05 μm. On the section taken on line II-II' of the erase core 14, as shown in FIG. 14, high melting point glass portions c at the left and right of an erase track 44 in the inner core section 38 are recessed about 0.02 μm and low melting point glass portions d are recessed 0.05 μm. Further, on the section taken on line III-III', as shown in FIG. 15, high melting point glass portions e are recessed and the inner core section 22 of the record/reproduce core 12 slopes slightly down to the left, opposite a center shield part f.

Since glass centers around the magnetic gap (read/write gap) 30 and the magnetic gap (erase gap) 40, the glass 46 is stepped and the magnetic gap (read/write gap) 30 is recessed 0.005–0.01 μm below its surrounding, leading to a spacing loss and causing the read/write characteristic to be lowered 10–20%. Since the track definition grooves 34, 42a, and 42b of the record/reproduce core 12 and the erase core 14 are tilt grooves, orientation of the record/reproduce core 12 and the erase core 14 are not visible and they are hard to assemble.

SUMMARY OF THE INVENTION

Accordingly, it is an object of the invention to provide a method of manufacturing combined cores which are stable in quality and have a good yield by processing with the face on the BH side as a reference in manufacturing a combined core formed by combining two ferrite core structures each made up of two ferrite members forming a ring core. It is another object of the invention to provide a method of manufacturing a combined magnetic head core by which a misalignment between the center line T1 of a record/reproduce core and the center line T2 of an erase core can lie within the allowable range of 4 μm for eliminating trouble such as an adjacent track erasing a record or the actual recording track width being narrowed and so track definition grooves can also be cut for long (30-mm or longer) ferrite core structures to improve the efficiency of manufacturing combined magnetic head cores.

It is a further object of the invention to provide a combined magnetic head core having the merits of small magnetic resistance, good read/write characteristic, good track definition groove depth precision and jig height precision, visible gap cutoff part dimension Q, fast processing speed, and easy-to-see positions of the record/reproduce and erase cores for improving ease of assembly.

It is a still further object of the invention to provide a method of easily and efficiently manufacturing a combined magnetic head core.

To these ends, according to one aspect of the invention, there is provided, in a method of manufacturing a tunnel erase type combined magnetic head core comprising the steps of:

combining a first core member having a predetermined pole height dimension defined by a surface on a magnetic gap formation side and an apex and a predetermined back height dimension defined by the apex and a bottom of a coil core which is inserted into a coil, and a second core member so that a magnetic gap of a predetermined dimension is formed on the pole height side and forming a core blank by a first glass bonding;

forming track definition grooves of a predetermined depth on a surface on the pole height side of the core blank for forming tracks of a predetermined width and forming a read/write core structure and an erase core structure;

combining the read/write and erase core structures and forming a combined core structure by a second glass bonding; and cutting the combined core structure to a desired thickness to provide combined core chips, the improvement comprising the steps of:

using the bottom of the coil core of the first core member of the core blank as a back height reference face and with the back height reference face as reference, grinding the surface on the pole height side of the core blank;

with the back height reference face of the first core member of the core blank as reference, forming track definition grooves of a predetermined depth on the surface on the pole height side of the core blank for forming tracks of a predetermined width and forming a read/write core structure and an erase core structure;

with the back height reference face of the first core member as reference, combining the read/write and erase core structures and forming a combined core structure by the second glass bonding; and with the back height reference face of the first core member as reference, grinding the surface on the pole height side of the combined core structure.

Further, in the method, the height dimension of the second core member is smaller than the total height dimension of the first core member and the surface on the back height side of the second core member is located more toward the inner side than the back height reference face of the first core member.

Further, in the method, at least the read/write core structure among the read/write and erase core structures has track definition grooves whose depth from the surface on the pole height side of the read/write core structure is constant for defining a track of a predetermined width.

According to another aspect of the invention, there is provided, in a method of manufacturing a tunnel erase type combined magnetic head comprising the steps of:

combining a first core member having a predetermined pole height dimension defined by a surface on a magnetic gap formation side and an apex and a predetermined back height dimension defined by the apex and a bottom of a coil core which is inserted into a coil, and a second core member so that a magnetic gap of a predetermined dimension is formed on the pole height side and forming a core blank by a first glass bonding;

forming track definition grooves of a predetermined depth on a surface on the pole height side of the core blank for forming tracks of a predetermined width and forming a read/write core structure and an erase core structure;

combining the read/write and erase core structures and forming a combined core structure by a second glass bonding; and cutting the combined core structure to a desired thickness to provide combined core chips, the improvement comprising the steps of:

using the bottom of the coil core of the first core member of the core blank as a back height reference face and with the back height reference face as reference, grinding the surface on the pole height side of the core blank;

with the back height reference face of the first core member of the core blank as reference, forming track definition grooves of a predetermined depth on the surface on the pole height side of the core blank for forming tracks of a predetermined width and forming a read/write core structure and an erase core structure;

with the back height reference face of the first core member as reference, combining the read/write and erase core structures and forming a combined core structure by the second glass bonding;

with the back height reference face of the first core member as reference, grinding the surface on the pole height side of the combined core structure; and with the back height reference face of the first core member of the combined core chip as reference, combining the combined core chip and a slider and grinding a top of the slider and a surface on the pole height side of the combined core chip for forming a magnetic gap of the combined core chip to a predetermined gap dimension.

Therefore, according to the invention, the BH of the first core member (U bar) is processed with good precision when the U bar is a single unit, and the width of the U bar is made slightly wider than that of the second core member (I bar) and with the surface on the PH side of the U bar and one surface of the I bar aligned, the level difference corresponding to the width difference between the U and I bars is produced in the first glass bonding to form a core blank, thereby performing post processing with the BH reference face as reference. Thus, the surface on the PH side can be easily processed at the intermediate steps, and the BH dimension does not change until completion; gap depth precision is easy to maintain. Even if the slider height precision is coarse, the combined core chip is incorporated into the slider and the surface on the PH side is processed with the BH reference face as reference, thus the gap depth can be processed with good precision. Since the I bar end is positioned further inside the core more than the BH reference face of the U bar, this level difference is useful for the BH reference processing method.

According to the method of manufacturing the combined magnetic head core of the invention, the combined magnetic head core can be manufactured easily and efficiently.

According to a further aspect of the invention, there is provided, in a method of manufacturing a tunnel erase type combined magnetic head core comprising the steps of:

combining a first core member having a predetermined pole height dimension defined by a surface on a magnetic gap formation side and an apex and a predetermined back height dimension defined by the apex and a bottom of a coil core which is inserted into a coil, and a second core member so that a magnetic gap of a predetermined dimension is formed on the pole height side and forming a core blank by a first glass bonding;

forming track definition grooves of a predetermined depth on a surface on the pole height side of the core blank for forming tracks of a predetermined width and forming a read/write core structure and an erase core structure;

combining the read/write and erase core structures and forming a combined core structure by a second glass bonding; and cutting the combined core structure to a desired thickness to provide combined core chips, the improvement comprising the steps of:

using the bottom of the coil core of the first core member of the core blank as a back height reference face and with the back height reference face as reference, grinding the surface on the pole height side of the core blank;

with the back height reference face of the first core member of the core blank as reference, placing a read/write core blank on one side of a jig and an erase core blank on the other side of the jig so that they are positioned opposite to each other and forming track definition grooves of a predetermined depth on the surface on the pole height side of the two core blanks for forming tracks of a predetermined width and forming the read/write core structure and the erase core structure;

with the back height reference face of the first core member as reference, combining the read/write and erase core structures and forming a combined core structure by the second glass bonding; and with the back height reference face of the first core member as reference, grinding the surface on the pole height side of the combined core structure.

Further, in the method, the track definition grooves of the read/write core structure set on one side of the jig and the track definition grooves of the erase core structure set on the other side are formed consecutively.

In the method of manufacturing the combined magnetic head core of the invention, one core blank and the other core blank are set on the jig with the same core members thereof opposite to each other and the track definition grooves are cut in the same batch, thus the processing conditions match and the record/reproduce and erase cores become the same in cumulative pitch error.

Therefore, when the pitches of the track definition grooves for defining read/write tracks are large, the pitches of the track definition grooves for defining erase tracks also become large; when the pitches of the track definition grooves are small, the pitches of the track definition grooves also become small. If the inner core section of the record/reproduce core structure and the inner core section of the erase core structure are combined to form a combined core structure, a misalignment between the center line T1 of the record/reproduce core structure and the center line T2 of the erase core structure is small and lies within the allowable range of 4 $\mu$m; trouble such as when an adjacent track erases a record and the actual recording track width is narrowed can be eliminated. Track definition grooves can be cut even for long (30-mm or longer) core blanks and efficiency of manufacturing combined magnetic head cores can be improved.

According to a still further aspect of the invention, there is provided a tunnel erase type combined magnetic head core including:

a read/write core and an erase core each provided by combining a first core member having a predetermined pole height dimension defined by a surface on a magnetic gap formation side and an apex and a predetermined back height dimension defined by the apex and a bottom of a coil core into which a coil is inserted, and a second core member so that a magnetic gap of a predetermined dimension is formed on the pole height side;

the erase core having track definition grooves whose depth from the surface on the pole height side of the erase core shallows gradually from the second core member to the first core member for defining a track of a predetermined width;

the read/write core having track definition grooves whose depth from the surface on the pole height side of the read/write core structure is constant for defining a track of a predetermined width, wherein the second core members of the read/write and erase cores are located and fixed so that they are opposite to each other.

Therefore, with the combined magnetic head core of the invention, the B dimension (BH - groove height) is small and even and the magnetic resistance R is also even; the read/write characteristic becomes good. The track definition grooves are linear grooves whose depth D is substantially constant in the axial direction of the contact areas, thus the groove depth precision and the workpiece contact face height precision with a jig become good. The core structure which abuts glass on a simple face becomes good in stability. Also, the inside of the glass is visible and gap cutoff part dimension Q is visible. If the edge of the core member is broken, a signal is read, thus noise occurs. The linear track definition grooves are filled with glass, and even if the glass contains process chipping, noise is not read, thus the processing speed can be raised.

Since the glass is disposed over the full length of the record/reproduce (or record) core as well as in the neighborhood of the magnetic gaps, recessing only in the neighborhood of the magnetic gaps does not occur and spacing loss becomes small and lowering of the read/write characteristic can be prevented. Since the record/reproduce core and the erase core differ in form with respect to their track definition grooves, the positions of the record/reproduce core and the erase core become easy to see, improving ease of assembly.

According to the invention, the combined magnetic head core can be manufactured easily and efficiently.

DESCRIPTION OF THE PREFERRED EMBODIMENTS

[Embodiment 1]

Figure 1:
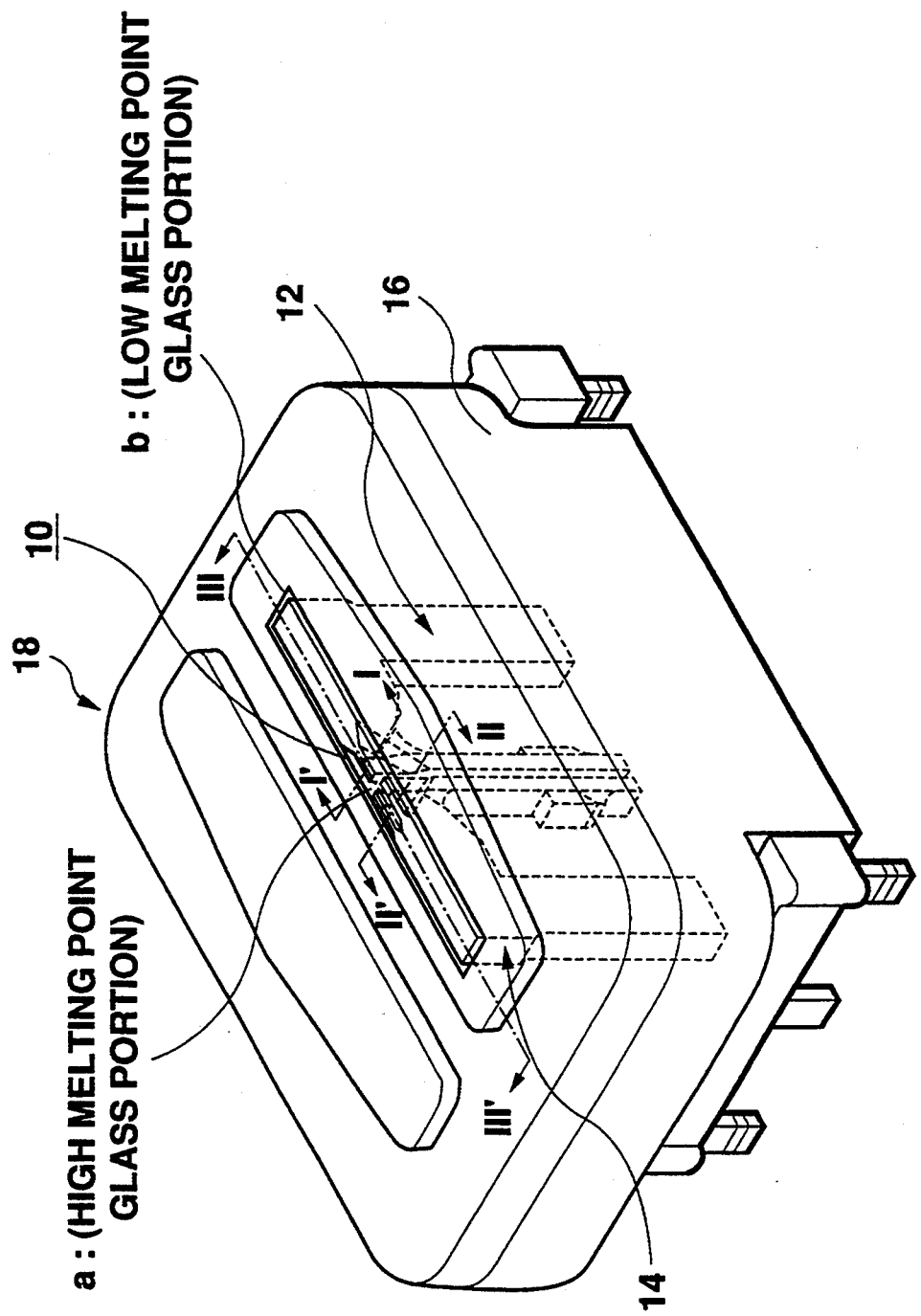
FIG. 1 is a perspective view of a combined magnetic head comprising a conventional combined magnetic head core.
Figure 2:
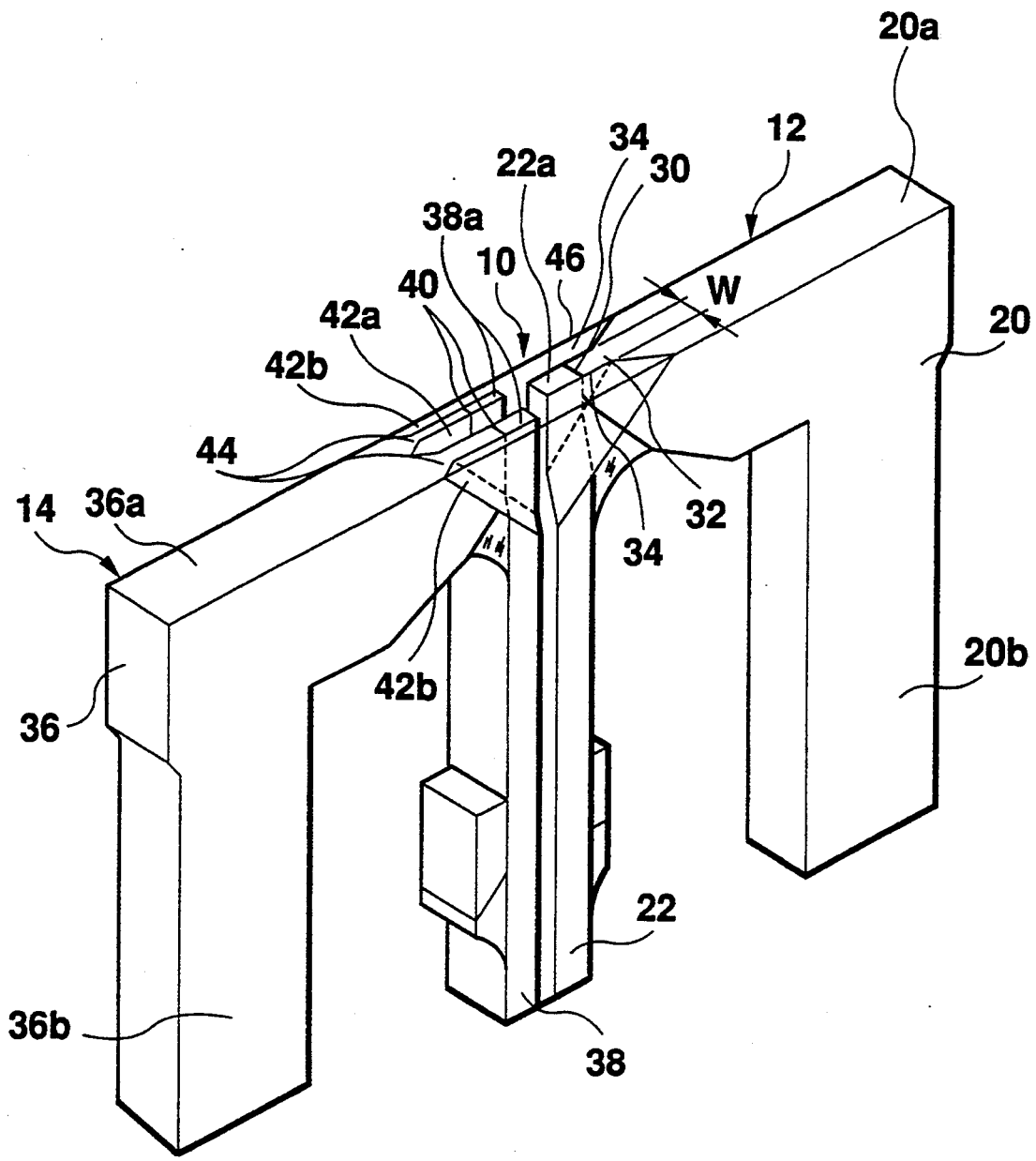
FIG. 2 is a perspective view of a conventional combined magnetic head core.
Figure 3:
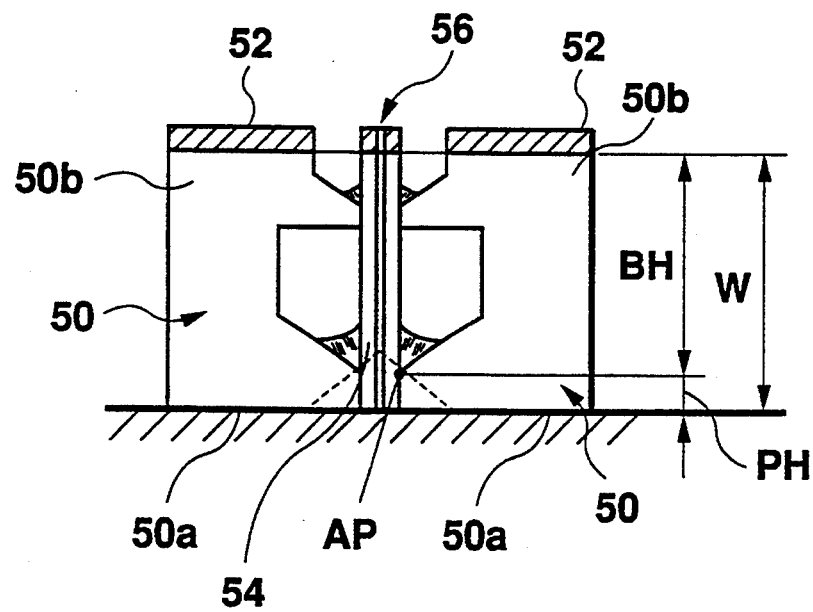
FIG. 3 is a drawing showing a conventional combined core processing method.
Figure 4:
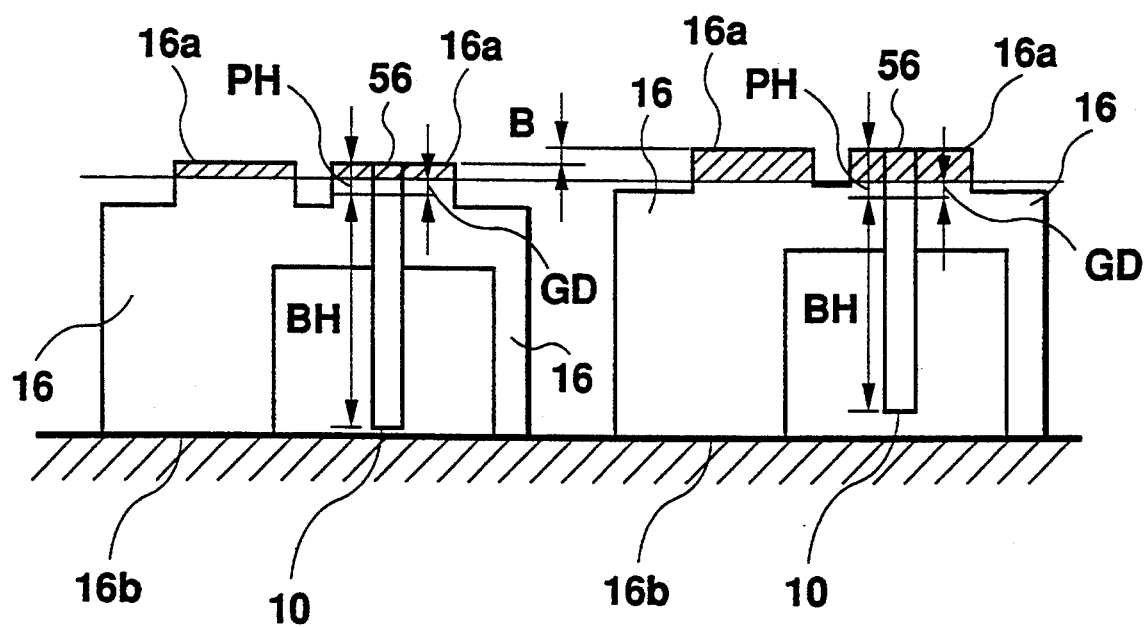
FIG. 4 is a drawing showing conventional processing steps of the surface on PH side after core chips are bonded to sliders.
Figure 5:
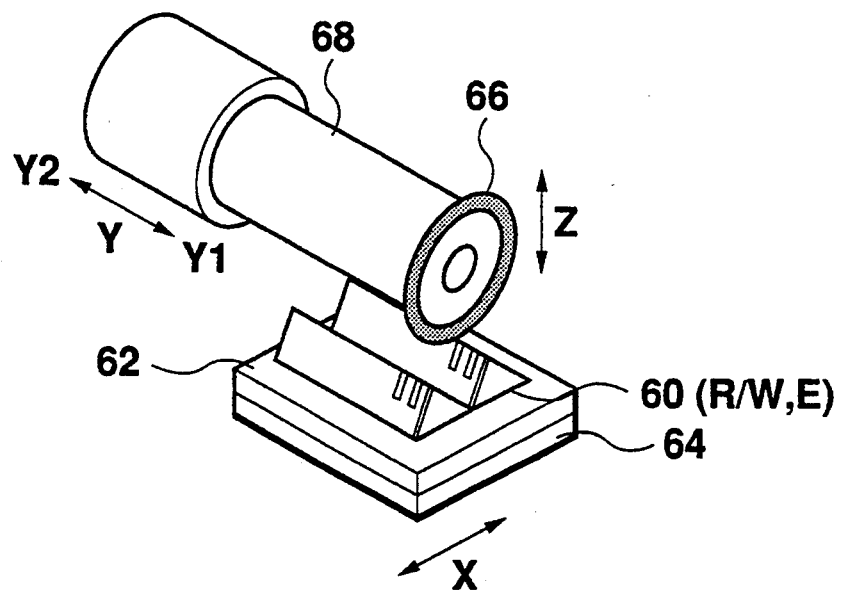
FIG. 5 is an illustration of track groove cutting by a blade in the related art.
Figure 7:
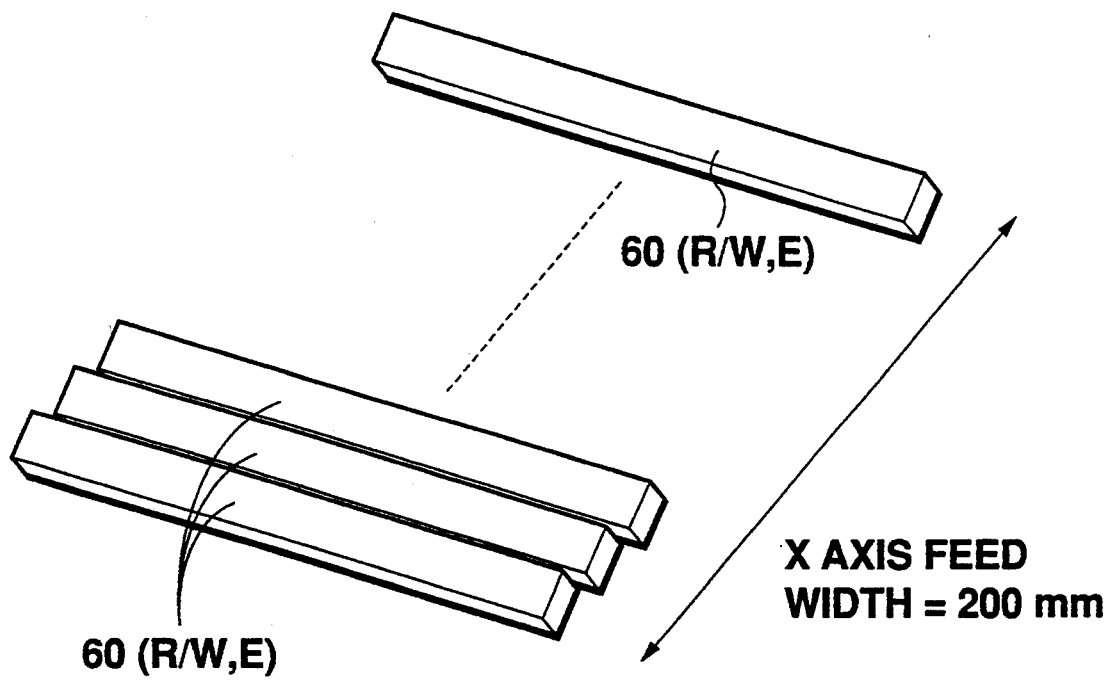
FIG. 7 is an illustration of the number of arranged core blanks with X axis feed width 200 mm of a turn table.
Figure 6:
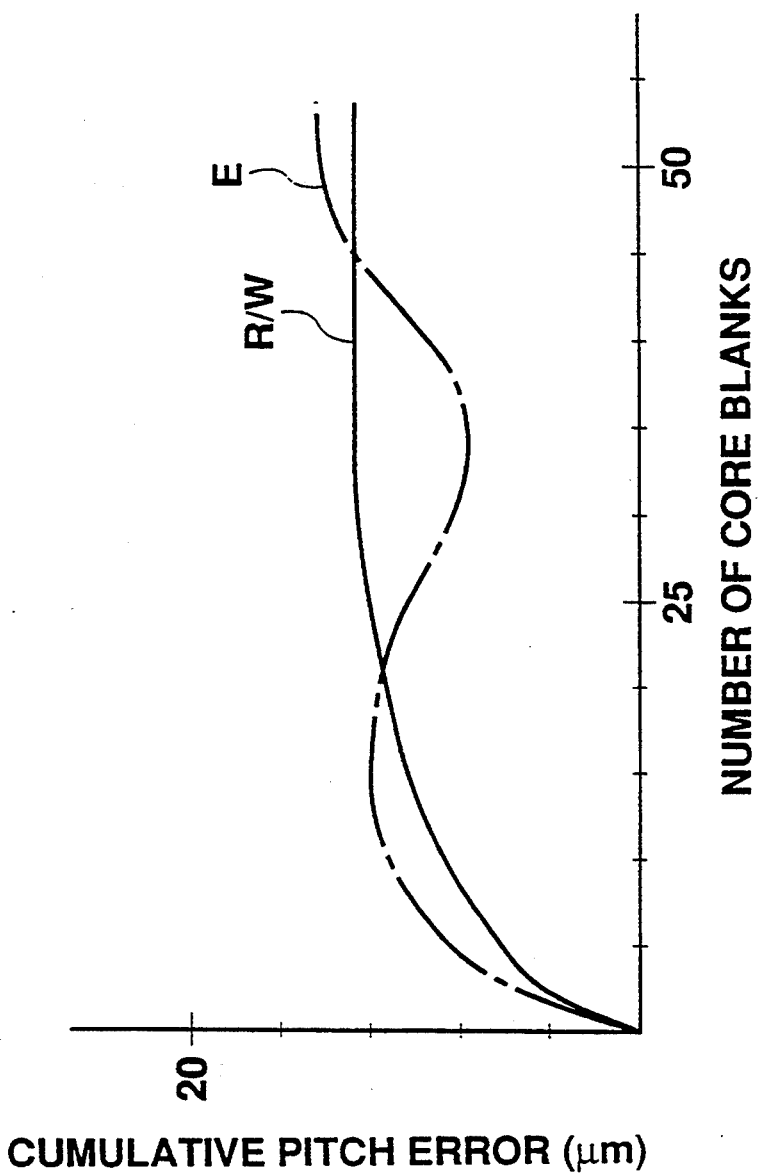
FIG. 6 is a graph showing the relationship between the number of core blanks and a cumulative pitch error in the related art.
Figure 8:
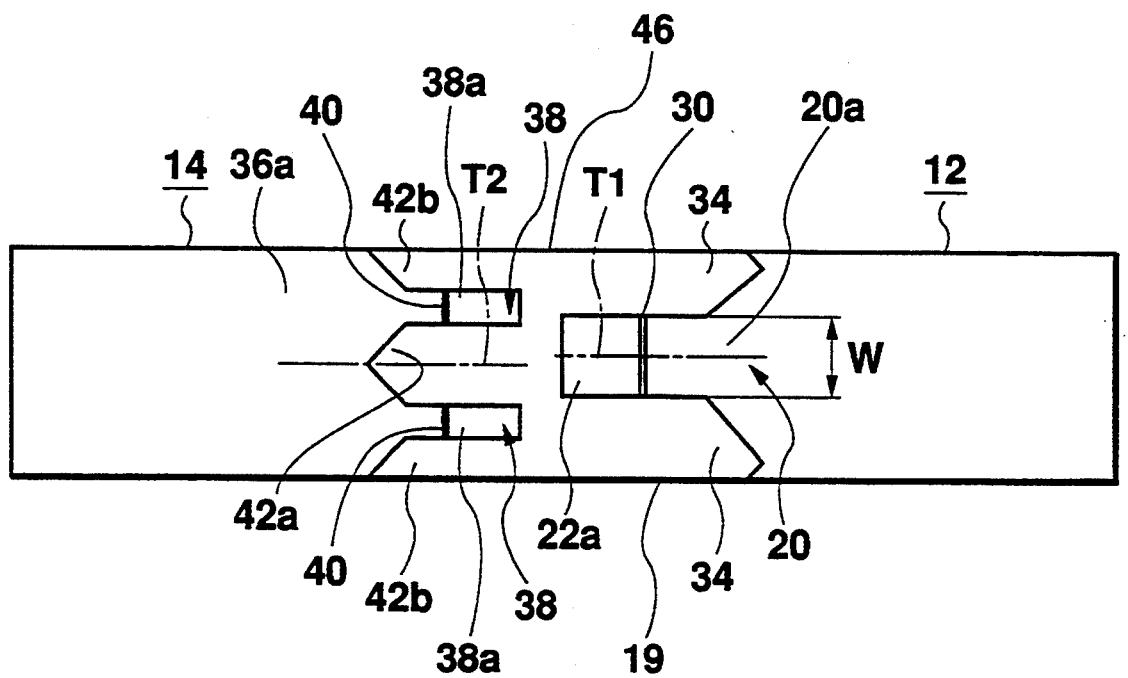
FIG. 8 is an illustration of a misalignment between center lines of a record/reproduce core and erase core in the conventional combined magnetic head core.
Figure 9:
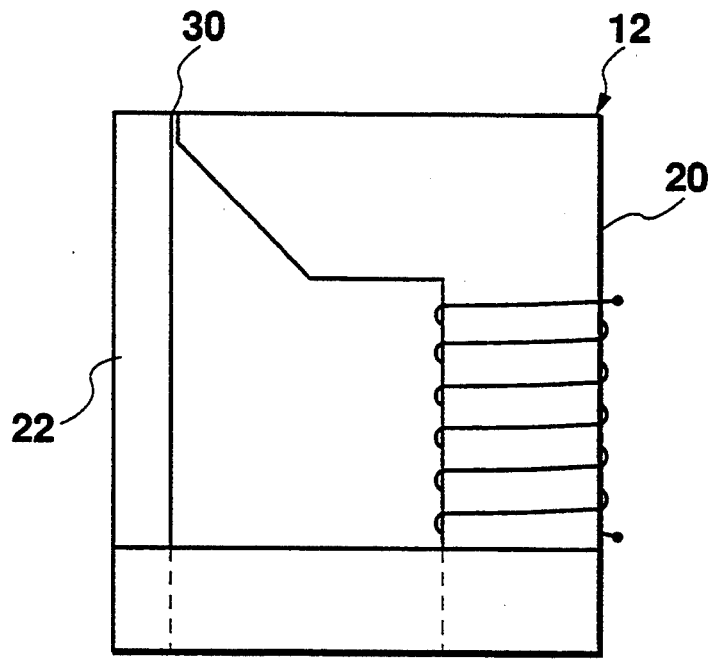
FIG. 9 is a front view of a core structure for illustrating magnetic resistance of the core.
Figure 10:
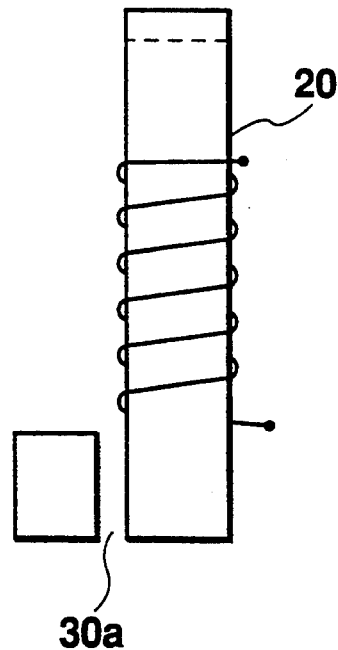
FIG. 10 is a side view of the core structure in FIG. 9.
Figure 11:
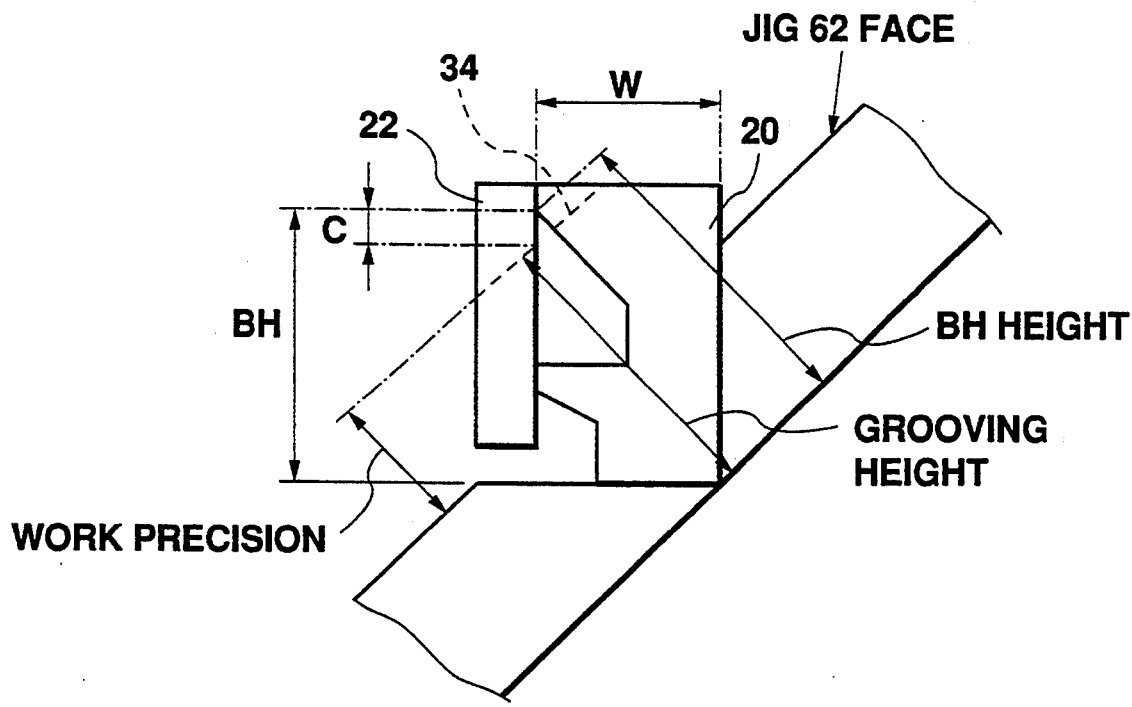
FIG. 11 a front view of a core blank with dimension indication to calculate the BH height and the grooving height.
Figure 12:
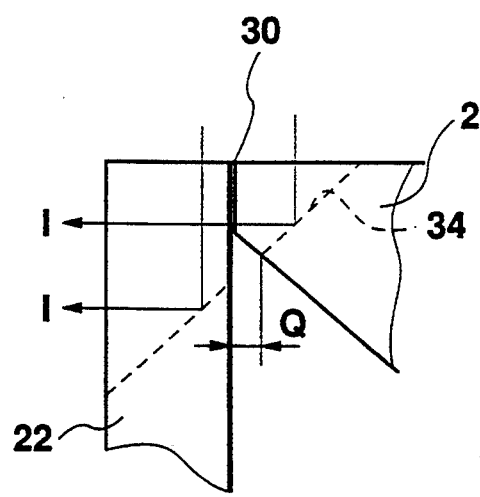
FIG. 12 is an illustration to see a gap disconnection section at core structure.
Figure 13:
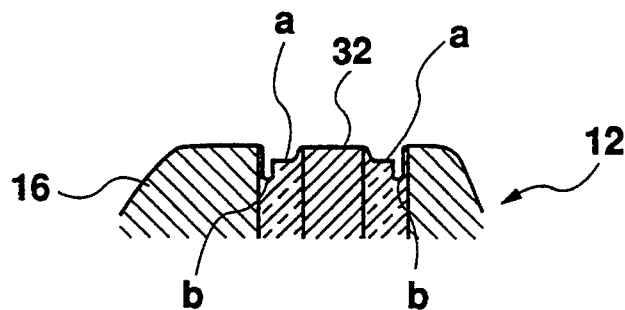
FIG. 13 is a sectional view taken on line I—I' of FIG. 1.
Figure 14:
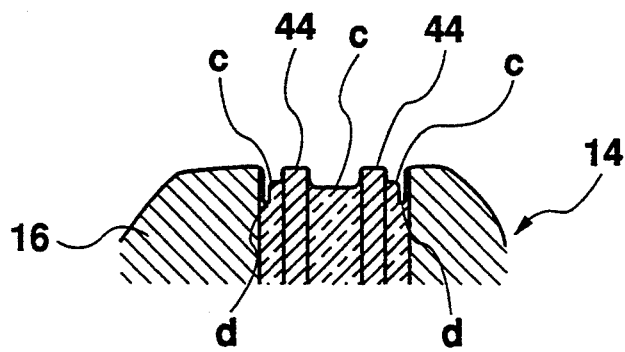
FIG. 14 is a sectional view taken on line II—II' of FIG. 1.
Figure 15:
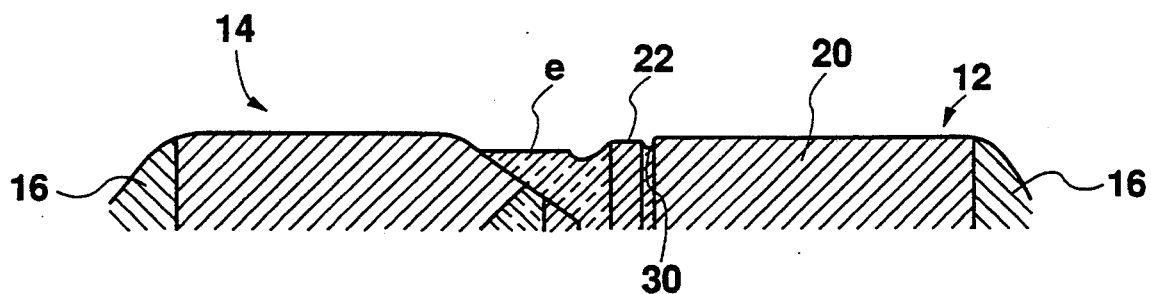
FIG. 15 is a sectional view taken on line III—III' of FIG. 1.
Figure 16:
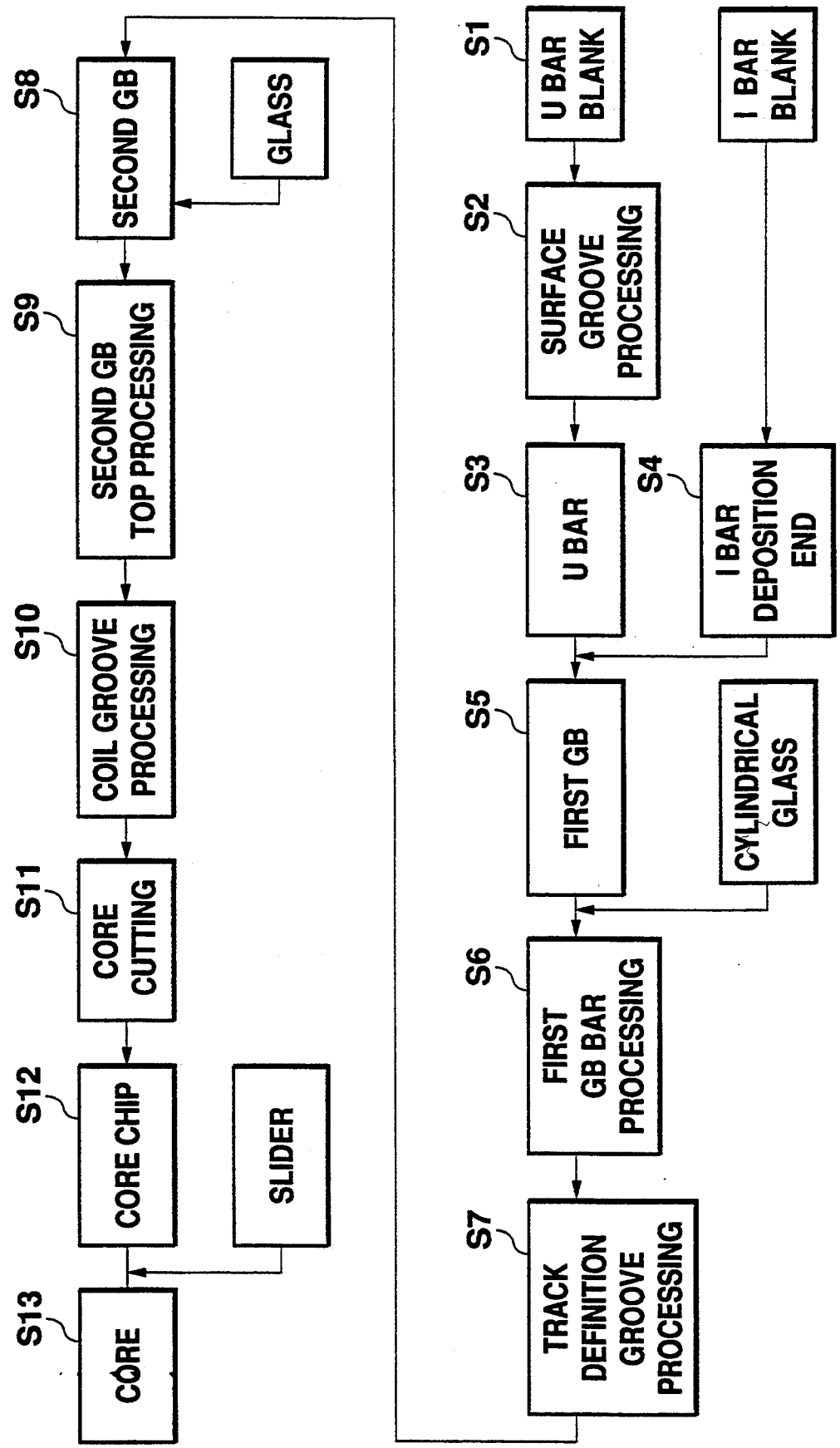
FIG. 16 is a schematic diagram showing a flow of manufacturing process of a combined magnetic head core according to a first embodiment of the invention.
Figure 17:
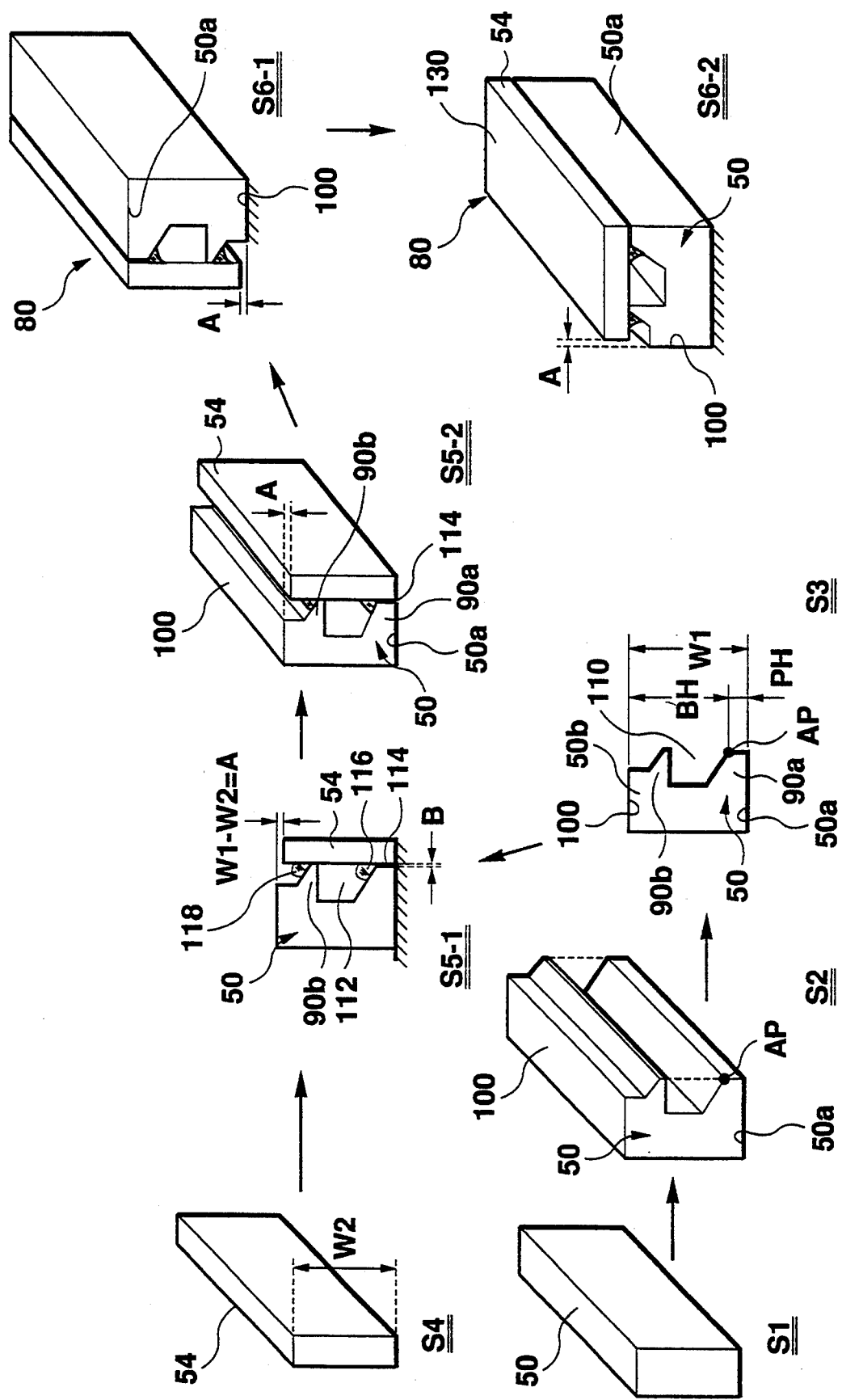
FIG. 17 is a drawing showing a process for forming a core blank of the combined magnetic head core according to the first embodiment of the invention.
Figure 18:
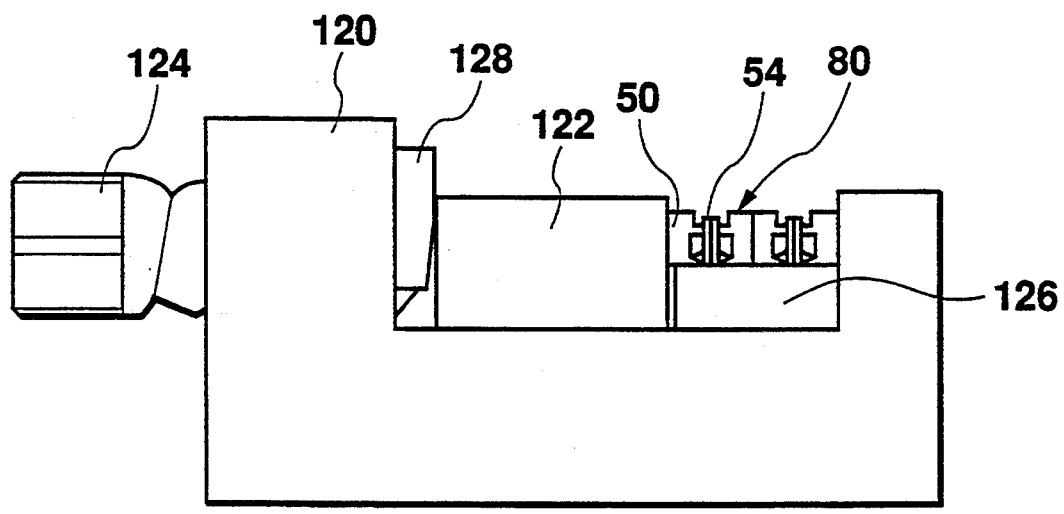
FIG. 18 is an illustration of a jig in the first glass bonding step in FIG. 16.
Figure 19:
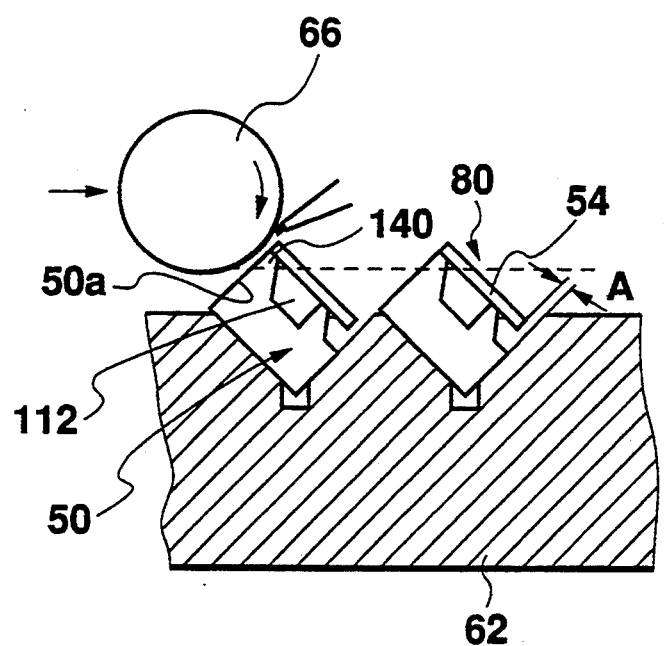
FIG. 19 is an illustration of the track definition groove processing step in FIG. 16.
Figure 20:
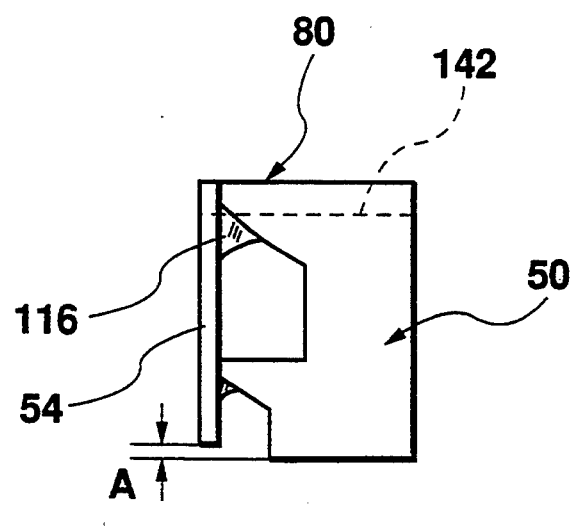
FIG. 20 is a side view of core structure showing another example of the track definition groove processing step in FIG. 16.
Figure 21:
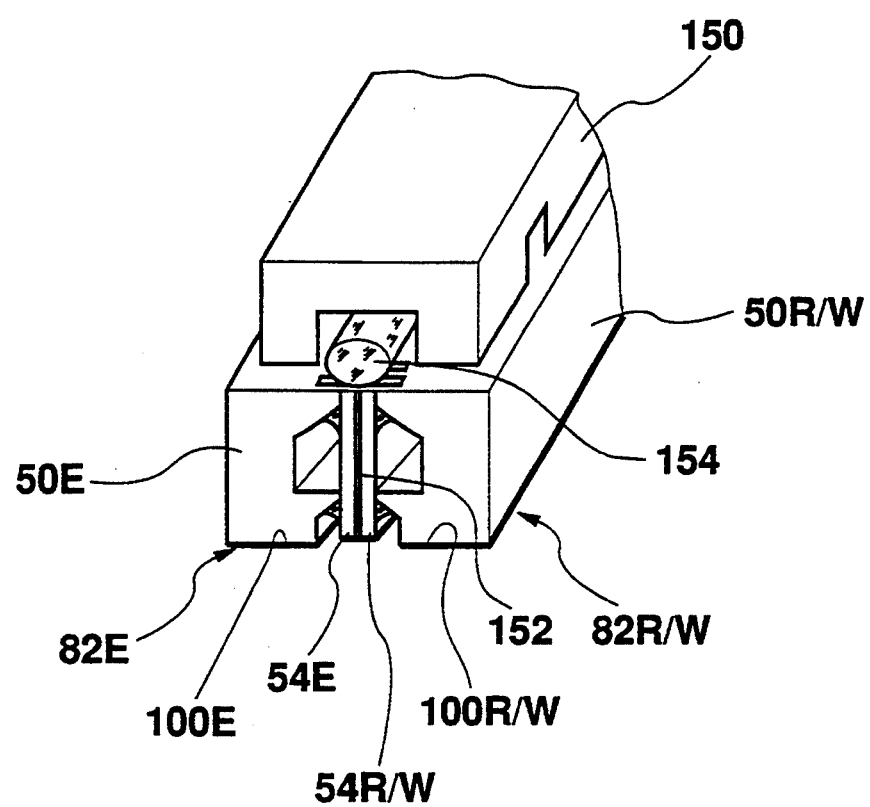
FIG. 21 is an illustration of the second glass bonding step in FIG. 16.
Figure 22:
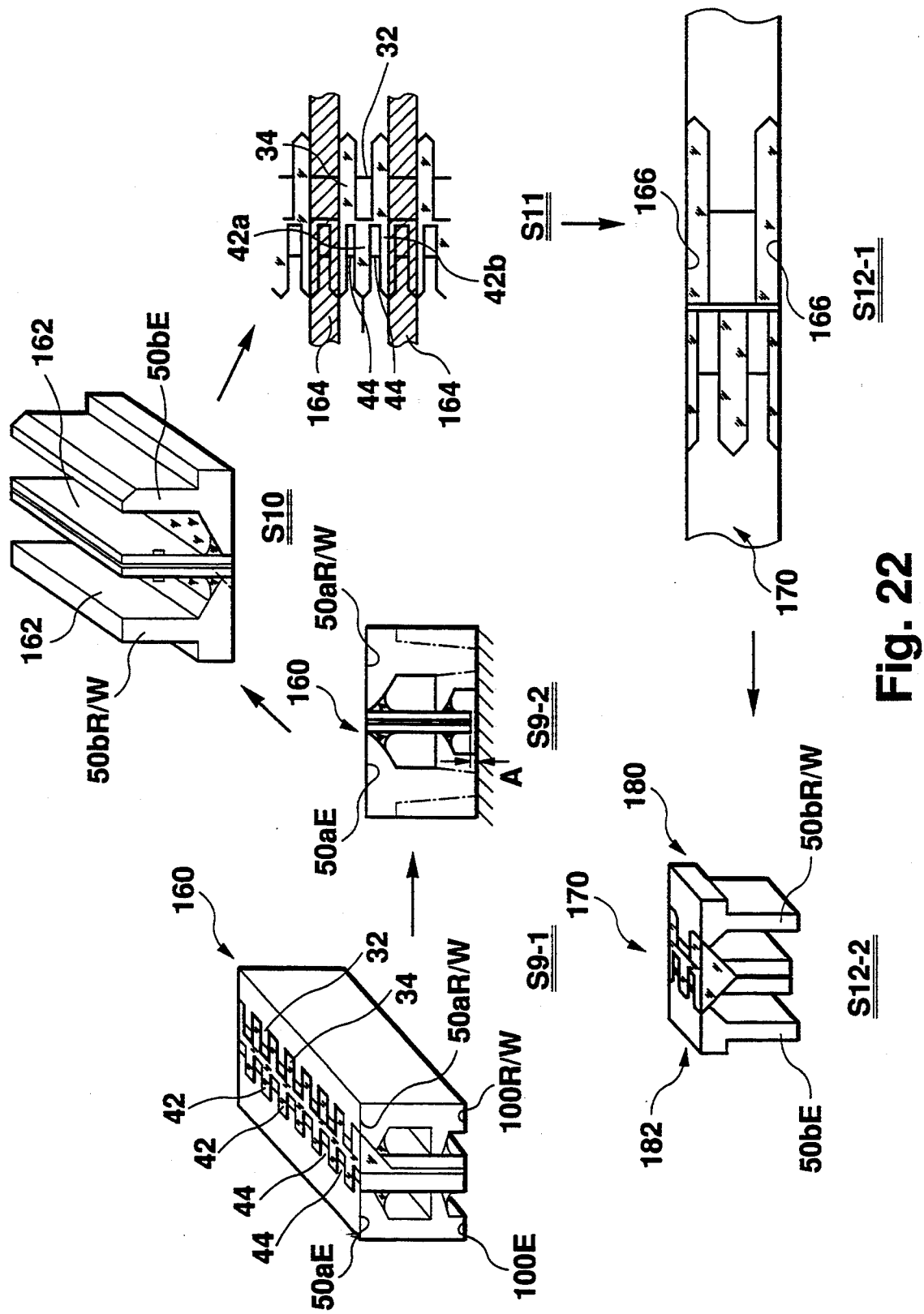
FIG. 22 is an illustration of a process for forming core chips in FIG. 16.

Referring now to the accompanying drawings, there is shown a preferred embodiment of the invention. FIG. 16 is a schematic diagram showing the flow of a manufacturing process for a combined magnetic head core according to a first embodiment of the invention. FIG. 17 is a drawing showing a process for forming a core blank (steps S1 to S6 in FIG. 16). FIG. 18 is an illustration of a jig in the step of the first GB in FIG. 16. FIG. 19 is an illustration of the track definition groove processing step (S7). FIG. 20 is a side view of a core structure showing another example of the track definition groove processing step (S7) in FIG. 16. FIG. 21 is an illustration of the step of the second GB (S8). FIG. 22 is a drawing showing a process for forming core chips (steps S8 to S12 in FIG. 16). Parts identical with or similar to those previously described with reference to FIGS. 1 to 15 are denoted by the same reference numerals in FIGS. 16 to 22, and will not be discussed again.

Surface groove processing of a first core member (U bar blank) and deposition of a second core member (I bar blank) (S1 to S4):

First, as shown in S1 and S4 of FIG. 17, a first core member 50 made of ferrite, etc., and a second core member 54 made of ferrite, etc., are provided. Surface groove processing is applied to the first core member 50 at step S2. At the surface groove processing step, the first core member 50 is bonded to a grinding plate and set on a slicing machine, then ground with a multi-grinder for surface groove processing. Then, a cup grinder is used for oblique mirror-like finishing and predetermined face processing to form a face shown as 100 in FIG. 17.

The first core member 50 has a pole height (PH) dimension defined by a surface on the magnetic gap formation side and an apex shown as Ap in FIG. 17 and a back height (BH) dimension defined by the apex and the bottom of 50b forming a coil core; the sum of PH and BH is the width w1 of the first core member 50 (S3).

Thus, the section at right angles to the length with the length several 10 mm is formed substantially like a letter U. The width w1 of the first core member (U bar) 50 after the surface on the back height side is smoothly ground so as to make back height precision with Ap as reference is processed to about 3050 μm, for example. As a feature of the embodiment, the PH value subtracted from the width w1, namely, the back height (BH) remains unchanged until core completion because the process is executed with the back height reference face 100 as a reference.

On the other hand, the section at right angles to the length of the second core member 54 with the length of several 10 mm is formed substantially like a letter I. The width w2 of the second core member (I bar) 54 is about 2950 μm, for example. A coating of $SiO_2$ is deposited on at least one face, and the record/reproduce side and erase side of the magnetic head differ in film thickness of the deposited coating; the film thickness becomes the gap length intact (S4).

First glass bonding (GB) (S5: S5-1 and S5-2):

Next, as shown in FIG. 17, the surface 50a on the PH side of the U bar 50 and one face of the I bar 54 are aligned and the opening 110 formed by projections 90a and 90b of the U bar 50 is closed up with the deposited coating side of the I bar 54 to form a hole 112 for coil winding. A magnetic path like a ring is formed. A magnetic gap having a predetermined gap β is formed between the projection 90a on the PH side of the U bar 50 and the opposite face of the I bar 54 in the direction crossing the magnetic path. In this state, glass bars 116 an 118 are inserted into the hole of the U bar 50 and the groove formed by the projection 90b of the U bar and the I bar 54 and located near (S5-1), then heated, thereby filling the magnetic gap 114 with glass 16 and the gap between the projection 90a of the U bar 50 and the I bar 54 with glass 118 (S5-2). This process is intended for protection of the magnetic gap 114 against later processing and use.

By the first glass bonding, the difference in level, A, (the width difference between the U bar 50 and the I bar 54), for example, of about 100 μm, occurs on the BH side and a core blank 80 is formed. A first glass bonding jig main unit 120 in FIG. 18 is made of alumina material. The U bar 50 and the I bar 54 are placed on a plate 126 with the surface 50a on the PH side of the U bar 50 and one face of the I bar 54 aligned, and pressed with a wedge 128 or a cap screw 124 through a push plate 122.

In this state, the first glass bonding is performed to form the core blank 80.

First GB bar processing (S6: S6-1 and S6-2):

Next, with the BH reference face 100 as reference of processing, the surface 50a on the PH side is smoothly processed (S6-1). The two core blanks 80 for R/W core and E core are the same in width dimension. If the processing margin at step S6-1 is, for example, 200 μm, the width dimension becomes 2850 μm. Processing is performed so as to reduce the PH with the BH unchanged. At this time, the level difference A exists and the end of the I bar 54 is low, thus the BH side of the I bar does not hinder side reference on the BH side, and the surface 50a on the PH side can be processed without any obstacle. Further, with the side of the U bar 50 of the core blank 80 as reference, work face 130 of the side of the I bar 54 is processed so as to reduce the thickness of the I bar 54 (S6-2). The core blank for 1M bytes differs from that for 2M bytes in the thickness of the I bar 54.

Track definition groove processing (S7):

Further, as shown in FIG. 19, a number of the core blanks 80 (for R/W core and E core) are placed at a time in V-form grooves formed on a track definition groove processing jig 62 made of alumina material (S7). By moving a rotation blade 66 such as a diamond grinder, track definition grooves 140 are formed defining the track width inclined so that the depth becomes gradually shallower from the I bar 54 to the U bar 50 at the depth reaching the hole 112 for coil winding from the surface 50a on the PH side. At this time, since the level difference A exists, the core blank 80 can be placed in the V-form groove of the jib 30 without obstacle of the I bar 54.

Figure 23:
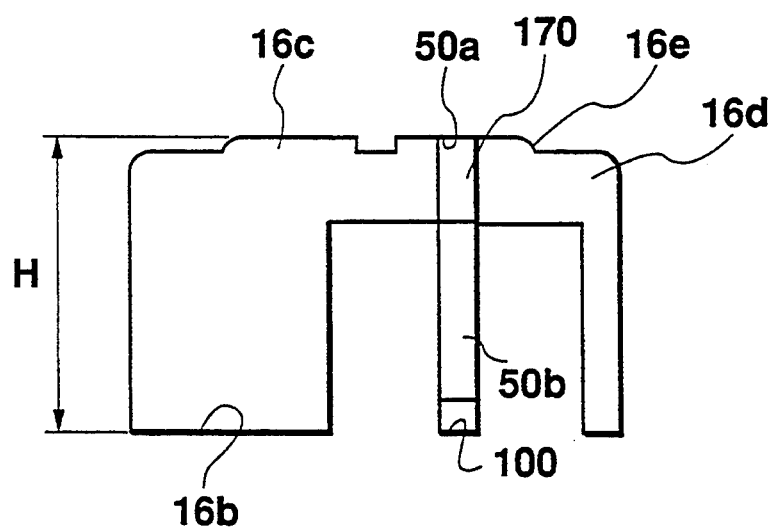
FIG. 23(a) is a sectional view of a combined core chip incorporated in sliders.
FIG. 23(b) is a side view of FIG. 23(a), viewed from the side of large slider 16c.
Figure 23:
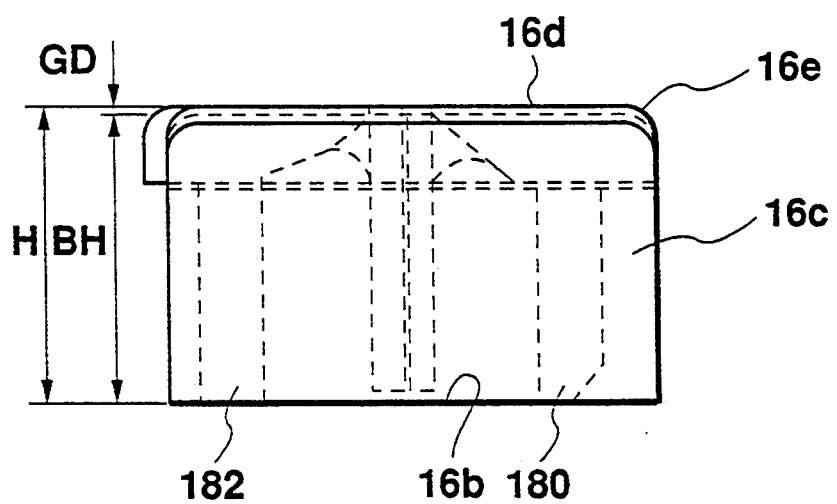

The track definition groove processing is described as oblique groove processing, but is not limited to such. As shown in FIG. 23 and described below in Embodiment 3, flat grooves 142 may be formed on at least either the core blank 80 for R/W core or that for E core.

Second glass bonding (GB) (S8):

Predetermined track definition groove processing is applied to the core blanks 80 to form R/W core structure 82R/W and E core structure 82E, as described above. As shown in FIG. 21, with the back height reference faces 100R/W and 100E of U bars 50R/W and 50E as reference, a thin glass plate 152 as a spacer is put between I bars 54R/W and 54E so that the I bars are placed back to back with a predetermined gap therebetween. The core structures 82R/W and 82E are combined into one so that the track definition grooves 140 formed on the core structures 82R/W and 82E are opposite to each other at predetermined positions and the BH reference faces 100R/W and 100E are placed in the same plane. That is, the core structures are combined so that the erase tracks 44 of the core structure 82E are placed in a zigzag fashion with respect to the read/write tracks 32 of the core structure 82R/W. Next, an elliptical glass rod 154 is placed on the track definition groove 140 formation portion of PH side surfaces 50aR/W and 50aE of the core structures 82R/W and 82E, and is then heated and melted, thereby filling the track definition grooves 140 formed on the core structures 82R/W and 82E with glass and permeating the gap between the core structures 82R/W and 82E with glass, thereby bonding the core structures 82R/W and 82E as one piece to form a combined core structure 160 as shown in S9 of FIG. 22. In the second glass bonding, the level difference A also works effectively. Heat-resistant inorganic adhesive such as ceramics is used for the bonding face of the core structures 82R/W and 82E. Unwelded carbon material, such as boron nitride, is used for a glass guide jig 150 for guiding the elliptical glass rod 154.

First GP top processing (S9: S9-1 and S9-2):

Next, as shown in S9 of FIG. 22, with the BH reference faces 100R/W and 100E on the BH side of the combined core structure 160 as reference, swollen surplus melted glass is removed from the PH side surfaces 50aR/W and 50aE, then the surfaces 50aR/W and 50aEa are processed. For example, if the processing margin is 50 μm, the surfaces are processed so that the remaining width becomes 2800 μm and the PH reduces without changing the BH. After the surfaces 50aR/W and 50aE are processed, a check is made to see if the core structures 82R/W and 82E match in positional relationship, to see if the groove width and the remaining width, etc., in the track definition groove 140 processing satisfy the specifications, etc., (S9-2). In the processing of the surfaces 50aR/W and 50aE, the level difference A is also useful.

Coil groove processing (S10):

The combined core structure 160 prepared at step S9 is then subjected to coil groove processing in which coil grooves 162 to insert coils and coil cores 50bR/W and 50bE of the U bars 50 are processed as shown in S10 of FIG. 22. Core cutting and core chip preparation (S11 and S12 (S12-1 and S12-2)):

Further, as shown in S11 of FIG. 22, as required, cut portions 164 of the combined core structure 160 are cut with cutting means such as a diamond cutter lengthwise to a predetermined length, so as to contain one or more of recording, reproducing, or erasing tracks 32 and 44 for magnetic recording media, thereby cutting out combined core chips 170. Next, one or both cut faces 166 of the combined core chip 170 are finished to a predetermined dimension at a lap processing step to form the desired combined core chips 170.

Magnetic head assembling (S13):

Next, as shown in FIG. 23, the core chip 170 and large and small sliders 16c and 16d, made of nonmagnetic ceramics such as calcium titanate, are bonded with the lower faces 16b of the large and small sliders 16c and 16d and the BH reference face 100 of the core chip 170 is therein aligned. Next, with the lower face 16b as reference, the slider top 16a and the PH side surface 50a of the combined core chip 170 are ground to finish to a predetermined height H so that if the processing margin is 100 μm, for example, the height H becomes 2700 μm, and so that the PH is reduced without changing the BH of the combined core chip 170. Now, the GD (magnetic gap depth) corresponding to the required electro-magnetic conversion characteristic value is specified. If the GD is decreased, the overwrite characteristic of the magnetic head can be improved; if the GD is increased, the resolution of the magnetic head can be improved. The BH of the combined core chip 170 is processed only once with good precision at a single unit of the U bar 50, and remains unchanged. Since the sum of the BH and GD becomes the height H of the sliders and combined core chip 170, the height precision of the large and small sliders 16c and 16d as a single unit is not required to be too great. Corners 16e of magnetic recording medium contact area of the large and small sliders 16c and 16d are rounded so as not to damage magnetic recording media by the magnetic head. Then, steps such as a predetermined assembly step are executed to complete a magnetic head having R/W core 180 and E core 182 (S13).

As described above, the BH dimension of the U bar 50 is processed only once with good precision and further the width w1 of the U bar 50 is made slightly wider than the width w2 of the I bar 54, for example, with the difference between them being about 100 μm, and the level difference A (for example, 100 μm) is formed on the BH reference face 100 of the U bar 50 to form the core blank 80. By adopting the processing method with the BH reference face as reference at later steps, efficient use can be made of the jig owing to the level difference A, GD precision is easy to maintain, slider precision may be rough, and high precision is not required for surface processing on the PH side at intermediate steps.

In the manufacturing method of the combined magnetic head core according to the embodiment of the invention, processing is performed with the BH reference face as reference, thus the BH side surface of the U bar is processed only once with good precision and the BH dimension does not change in later steps; high precision is not required for PH side surface processing or slider height in intermediate steps and magnetic gap depth precision is easy to maintain. The processing costs can be reduced and the magnetic head quality can be improved and stabilized. The level difference on the BH face made by the width difference between the U and I bars facilitates the manufacturing process and reduces the manufacturing costs; a great effect is realized.

[Embodiment 2]

An improvement in the track definition groove processing step described in the first embodiment is described as a second embodiment of the invention in conjunction with the accompanying drawings. FIG. 26 is an illustration showing a track definition groove cutting step with a blade for a combined magnetic head core according to the second embodiment of the invention. Parts identical with or similar to those previously described with reference to FIGS. 1 to 23 are denoted by the same reference numerals in FIGS. 24 to 29.

A method of manufacturing the combined magnetic head core according to the second embodiment comprises the steps of "surface groove processing of a first core member (U bar blank) and deposition of a second core member (I bar blank)," "first glass bonding (first GB)," "first GB finishing," "simultaneous processing of track definition grooves of R/W and E core structures," "second glass bonding (second GB)," "second GB top processing," "coil groove processing," and "core cutting and core chip preparation." The manufacturing method of the combined magnetic head core according to the second embodiment is characterized by the track definition groove processing step in which track definition grooves of R/W and E cores 180 and 182 are processed simultaneously.

At the steps of "surface groove processing of a first core member (U bar blank) and deposition of a second core member (I bar blank)," "first glass bonding (first GB)," and "first GB finishing," as shown in FIG. 17, two types of core blanks 80R/W and 80E each made up of a first core member 50 and a second core member 54 are formed for R/W and E cores. At the step of "second glass bonding (second GB)," as shown in FIG. 22, an R/W core structure 82R/W and an E core structure 82E are combined so that tracks 32 and 44 formed on the R/W and E core structures 82R/W and 82E have a predetermined positional relationship therebetween. As shown in FIG. 21, an elliptic glass rod 154 is put on the combined R/W and E core structures 82R/W and 82E and is heated and melted, thereby bonding the two core structures 82R/W and 82E as one piece.

Figure 24:
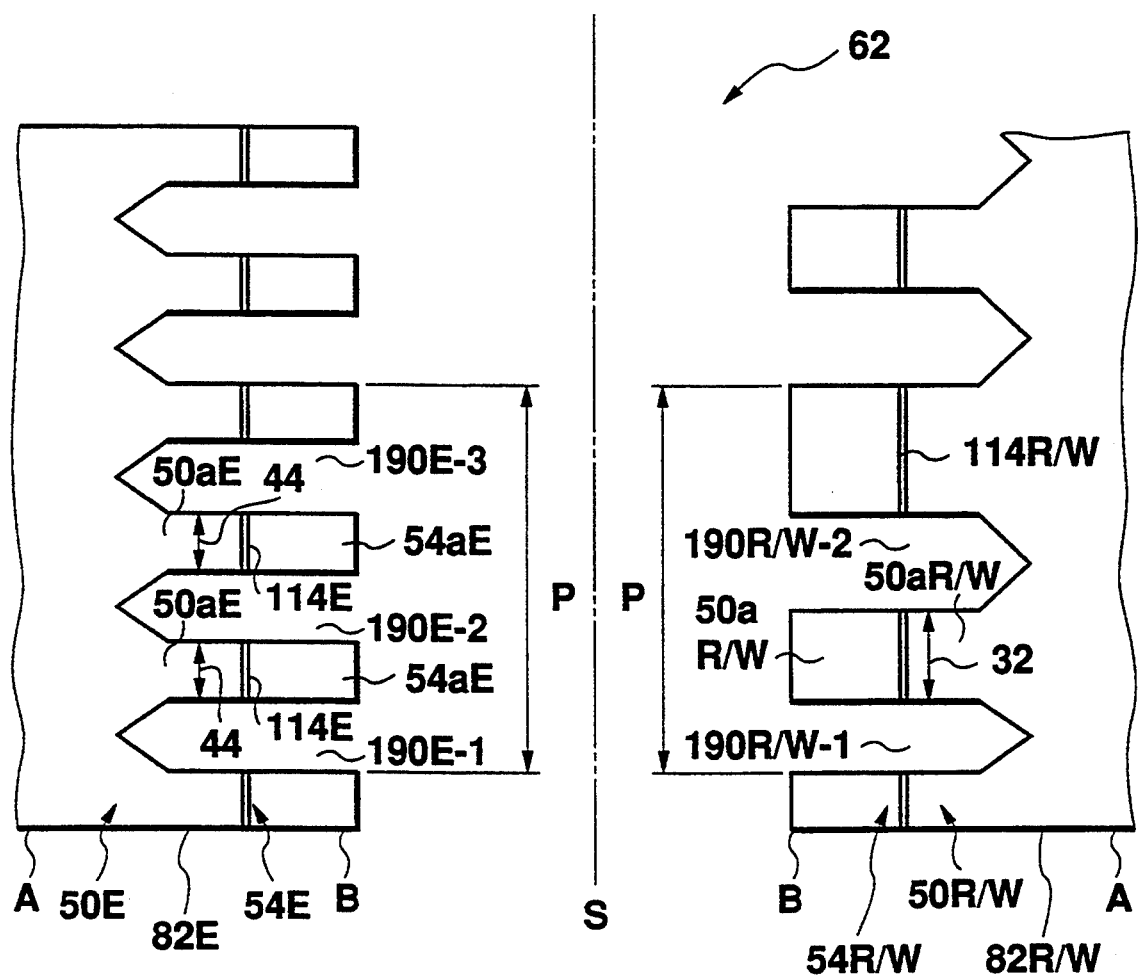
FIG. 24 is an illustration showing track definition groove processing of core structures.

The step of "simultaneous processing of track definition grooves of R/W and E core structures" is executed as follows: As shown in FIG. 24, in track definition groove processing of the E core structure 82E, the first, third, and fifth inclined track definition grooves for defining the track widths, 190E-1, 190E-2, and 190E-3, are cut gradually and more deeply from the surface on the PH side of the E core structure 82E from the first E core member 50E (outer core section) to the second E core member 54E (inner core section), thereby forming track definition grooves 190E parallel to each other and at predetermined intervals (track width).

In the center and both side portions of magnetic paths of contact areas 50aE and 54aE (the surface on the PH side), the first, third, and fifth track definition grooves 190E-1, 190E-2, and 190E-3 oblique in the axial direction of magnetic paths are formed across both the contact areas 50aE and 54aE, forming the E core structure 82E. The left and right magnetic path portions of the third track definition groove 190E-2 become erase tracks 44.

In track definition groove processing of the R/W core structure 82R/W, the second and fourth inclined track definition grooves for defining the track width, 190R/W-1 and 190R/W-2, are cut gradually and more shallowly with resect to the surface on the PH side of the R/W core structure 82R/W from the second R/W core member 54R/W (inner core section) to the first R/W core member 50R/W, thereby forming track definition grooves 190R/W parallel to each other and at predetermined intervals (track width).

In the center and both side portions of magnetic paths of contact areas 50aR/W and 54aR/W (the surface on the PH side), the second and fourth track definition grooves 190R/W-1 and 190R/W-2 oblique in the axial direction of magnetic paths are formed across both the contact areas 50aR/W and 54aR/W. The magnetic path portion between the second and fourth track definition grooves 190R/W-1 and 190R/W-2 becomes a read/-write track 32.

Figure 25:
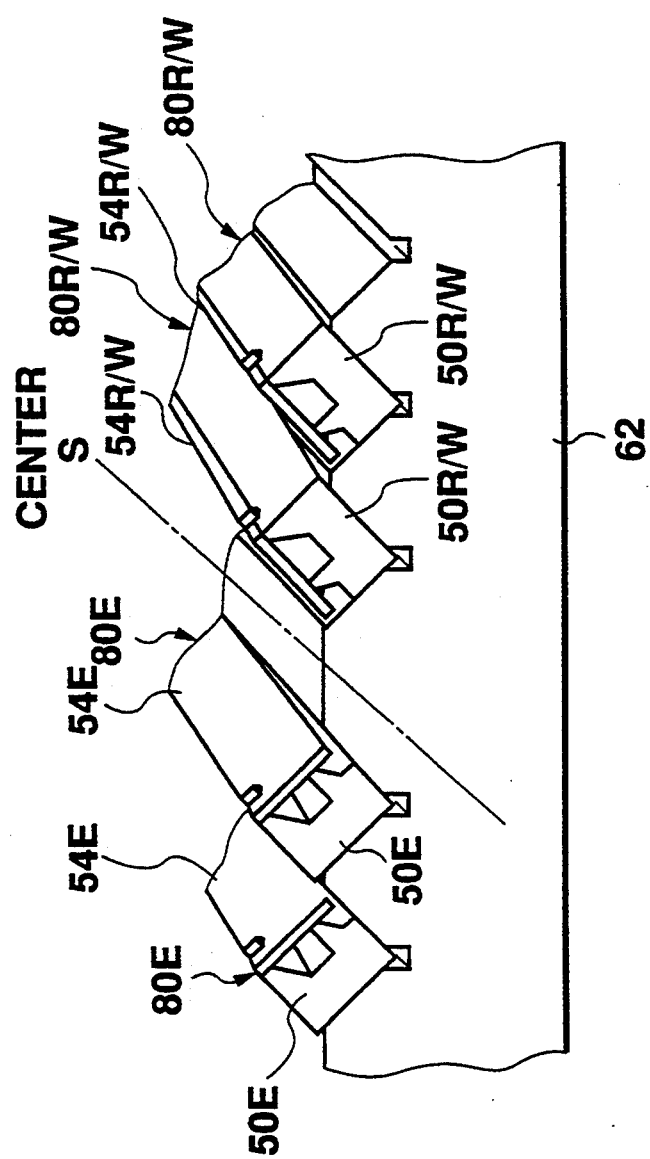
FIG. 25 is an illustration where record/reproduce core blanks and erase core blanks are set on a jig.
Figure 26:
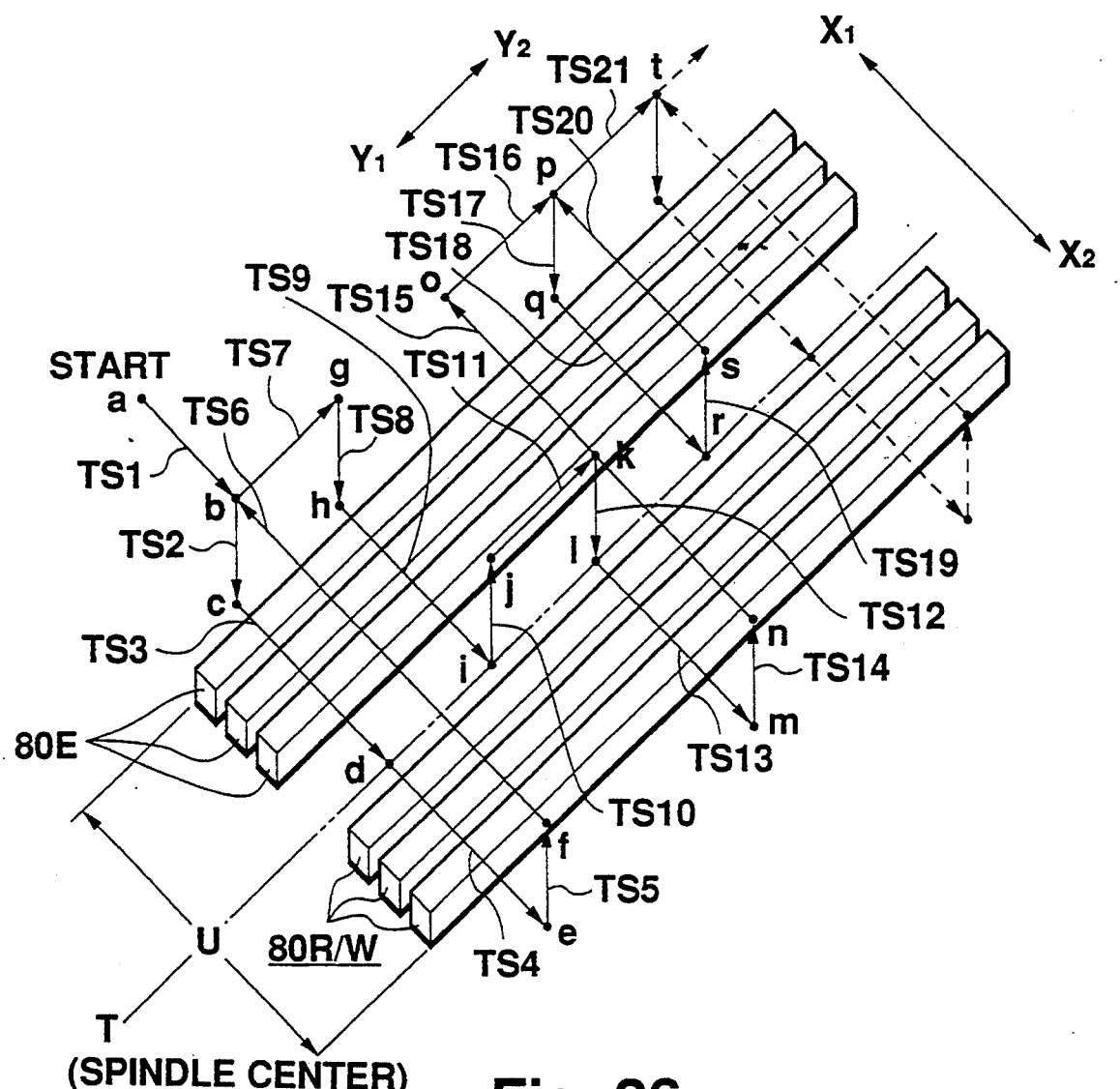
FIG. 26 is an illustration showing a track definition groove cutting step.

For track definition groove processing of E and R/W core structures 82E and 82R/W, erase and record/reproduce core blanks 80R/W and 80E are bonded onto a jig 62 as shown in FIG. 25.

On the left side of the center line of the jig 62 as a boundary, a number of erase core blanks 80E are set on the jig 62 at predetermined intervals with the inner core section 54E of each erase core blank 80E faced toward the center line S and inclined at a predetermined angle. On the right side of the center line of the jig 62 as a boundary, as many record/reproduce core blanks 80R/W as the number of the erase core blanks 80E are set on the jig 62 at predetermined intervals with the inner core section 54R/W of each record/reproduce core blank 80R/W facing toward the center line S and inclined at a predetermined angle.

Figure 27:
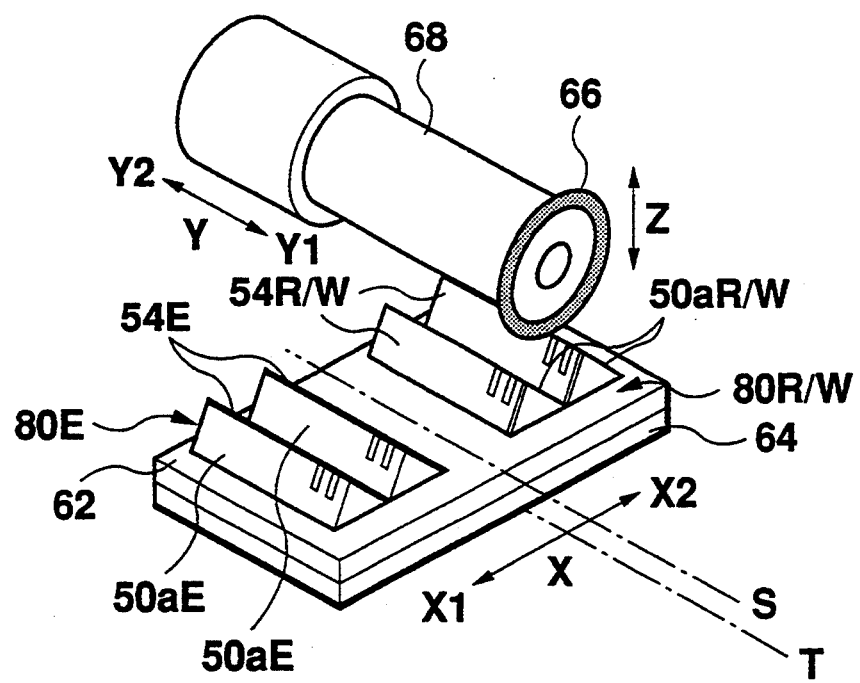
FIG. 27 is an illustration of track definition groove cutting with a blade.

As shown in FIGS. 26 and 27, the jig 62 is set on a work table 64 so that the center line S of the jig 62 is positioned to the center (spindle center) T of the work table 64, and the erase core blanks 80E and the record-/reproduce core blanks 80R/W are located within a cutting stroke U.

A blade 66 which is mounted on one end of a spindle 68 can be moved back and forth in the direction Y (Y1-Y2) and in the vertical direction Z and the work table 64 can be moved in the horizontal direction X (X1-X2).

As shown in FIGS. 26 and 24, the rotating blade 66 is first positioned at start point a, and as the work table 64 moves in the left direction X1, it reaches point b (step TS1), then falls to point 3 (step TS2), and as the work table 64 moves in the left direction X1, it cuts first track definition grooves 190E-1 of the erase core blanks 80E and arrives at point d (step TS3).

Next, as the work table 64 further moves in the left direction X1, the blade 66 cuts second track definition grooves 190R/W-1 of the record/reproduce core blanks 80R/W and arrives at point e (step TS4). The blade 66 rises from the point e to point f (step TS5), and as the work table 64 moves in the right direction X2, returns to the point b (step TS6).

Next, the blade 66 is fed backward (Y2) to point g (step TS7) and falls to point h (step TS8). As the work table 64 moves in the left direction X1, the blade 66 cuts third track definition grooves 190E-2 of the erase core blanks 80E and arrives at point i (step TS9).

Next, the blade 66 rises to point j (step TS10), is fed backward Y2 to point k (step TS11), and falls to point l (step TS12). As the work table 64 moves in the left direction X1, the blade 66 cuts fourth track definition grooves 190R/W-2 of the record/reproduce core blanks 80R/W and arrives at point m (step TS13). The blade 66 rises to point n (step TS14), and as the work table 64 moves in the right direction X2, arrives at point o via the point k (step TS15).

Next, the blade 66 is fed backward (Y2) to point p (step TS16) and falls to point q (step TS17). As the work table 64 moves in the left direction X1, the blade 66 cuts fifth track definition grooves 190E-3 of the erase core blanks 80E and arrives at point r (step TS18). The blade 66 rises to point s (step TS19), and as the work table 64 moves in the right direction X2, returns to the point p (step TS20), and is fed backward (Y2) to point t (step TS21).

One cycle of cutting the track definition grooves (the first track definition grooves 190E-1 to fifth track definition grooves 190R/W-2) is now complete.

By repeating the track definition groove cutting cycle, the first, third, and fifth track definition grooves 190E-1 (two to n grooves), 190E-2 (two to n grooves), and 190E-3 (two to n grooves) are cut on the erase core blanks 80E, and the second and fourth track definition grooves 190R/W-1 (two to n grooves) and 190R/W-2 (two to n grooves) are cut on the record/reproduce core blanks 80R/W.

According to the embodiment, at the step of forming the read/write tracks 32 and the erase tracks 44, with the center line of the jig 62 as a boundary, a number of record/reproduce core blanks 80R/W and erase core blanks 80E are set on the jig 62 at predetermined intervals with the inner core sections 54R/W and 54E of the record/reproduce and erase core blanks 80R/W and 80E faced toward the center line S and inclined at a predetermined angle outward the center line S, and with the blade 66, the first track definition grooves 190E-1 are cut on the erase core blanks 80E, the second track definition grooves 190R/W-1 are cut on the re-cord/reproduce core blanks 80R/W, the third track definition grooves 190E-2 are cut on the erase core blanks 80E, the fourth track definition grooves 190R/W-2 are cut on the record/reproduce core blanks 80R/W, and the fifth track definition grooves 190E-3 are cut on the erase core blanks 80E in order. By thus forming the first, third, and fifth track definition grooves 190E-1, 190E-2, and 190E-3 on the erase core blank 80E, erase tracks 44 are formed in the magnetic path of contact areas 50aE and 54aE of the erase core blank 80E, and by forming the second and fourth track definition grooves 190R/W-1 and 190R/W-2 on the record/reproduce core blank 80R/W, read/write track 32 are formed in the magnetic path of the record/reproduce core blank 80R/W.

As described above, the erase and record/reproduce core blanks 80E and 80R/W are set on the jig 62 with their inner core sections 54E and 54R/W opposite to each other and the track definition grooves 190 are cut in the same batch, thus the processing conditions match. The processing time form the first track definition grooves 190E-1 to the fifth track definition grooves 190R/W-2 is about five minutes, during which the temperature of the grinding lubricant of the spindle 68 changes 1° C.-2° C. at most. Since the spindle 68 itself has thermal capacity, during the processing time the spindle 68 hardly expands or contracts as the temperature changes. Thus, the record/reproduce and erase core blanks 82R/W and 82E where the track definition grooves 190 are formed become the same in cumulative pitch error.

Therefore, when the pitches of the track definition grooves 190R/W for defining read/write tracks 32 are large, the pitches of the track definition grooves 190E for defining erase tracks 44 also become large; when the pitches of the track definition grooves 190R/W are small, the pitches of the track definition grooves 190E also become small. If the inner core section 54R/W of the record/reproduce core structure 82R/W and the inner core section 54E of the erase core structure 82E are combined to form a combined core structure 160 as shown in FIG. 22, a misalignment between the center line T1 of the record/reproduce core structure 82R/W and the center line T2 of the erase core structure 82E is small and lies within the allowable range of 4 μm; trouble such that an adjacent track erases a record and the actual recording track width is narrowed can be eliminated.

When the record/reproduce and erase core structures 82R/W and 82E are combined so that their center lines S match as described above, the two combined core structures 82R/W and 82E become substantially the same in pitch error anywhere, thus track definition grooves can be cut even for long (for example, 30-mm or longer) core blanks 80 and efficiency of manufacturing combined magnetic head cores can be improved.

In the embodiment, at the step of forming the read/write tracks 32 and the erase tracks 44, with the center line of the jig 62 as a boundary, a number of record/reproduce core blanks 80R/W and erase core blanks 80E are set on the jig 62 at predetermined intervals with the inner core sections 54R/W and 54E of the record/reproduce and erase core blanks 80R/W and 80E faced toward the center line S and are inclined at a predetermined angle outward from the center line S, but with the center line of the jig 62 as a boundary, a number of record/reproduce core blanks 80R/W and erase core blanks 80E may be set on the jig 62 at predetermined intervals with the outer core sections 50R/W and 50E of the record/reproduce and erase core blanks 80R/W and 80E face toward the center line S and are inclined at a predetermined angle outward from the center line S.

Figure 28:
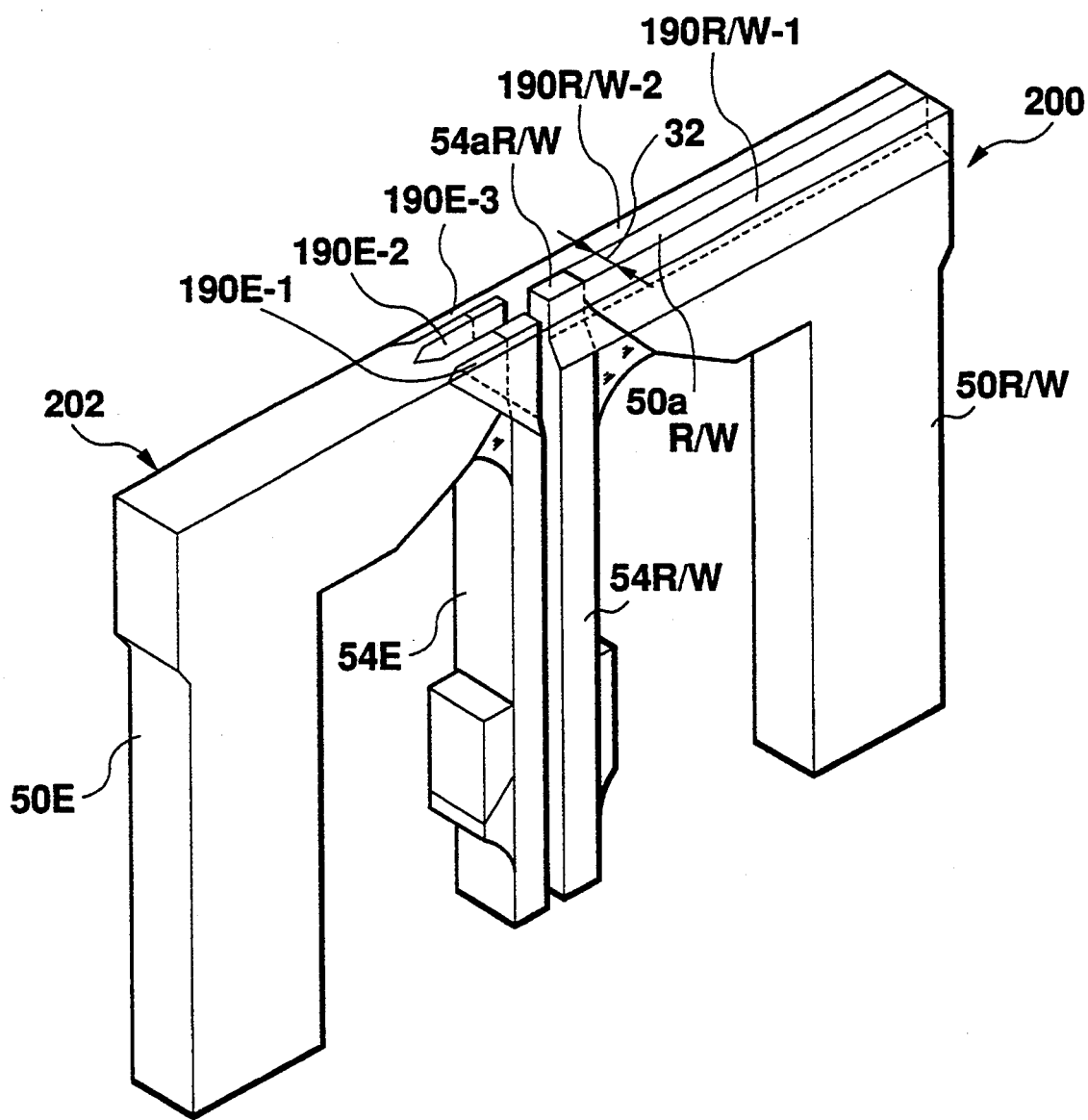
FIG. 28 is a perspective view showing another embodiment of a combined magnetic head core.

In the embodiment, the second, fourth, first, third, and fifth track definition grooves 190R/W-1, 190R/W-2, 190E-1, 190E-2, and 190E-3 formed on the record/reproduce and erase core blanks 80R/W and 80E are inclined, but as shown in FIG. 28, with the first, third, and fifth track definition grooves 190E-1, 190E-2, and 190E-3 of the erase core 202 inclined, the second and fifth track definition grooves 190R/W-1 and 190R/W-2 of the record/reproduce core 200 may be made linear grooves whose depth is constant.

In this case, a magnetic gap (read/write gap) 114R/W is formed between contact areas 50aR/W and 54aR/W of the outer core section 50R/W (first core member) and the inner core section 54R/W (second core member), and read/write track 32 is formed in the contact areas 50aR/W and 54aR/W. The track width of the read/write track 32 is defined by the track definition grooves 190R/W-1 and 190R/W-2 formed in both sides in the axial direction of the magnetic path of the contact areas 50aR/W and 54aR/W across the magnetic path portions on both sides of the magnetic gap 114, namely, across both the contact areas 50aR/W and 54aR/W. The track definition grooves 190R/W-1 and 190R/W-2 are linear grooves whose depth is constant, and are formed over the full length in the axial direction of the magnetic path of both the contact areas 50aR/W and 54aR/W.

Figure 29:
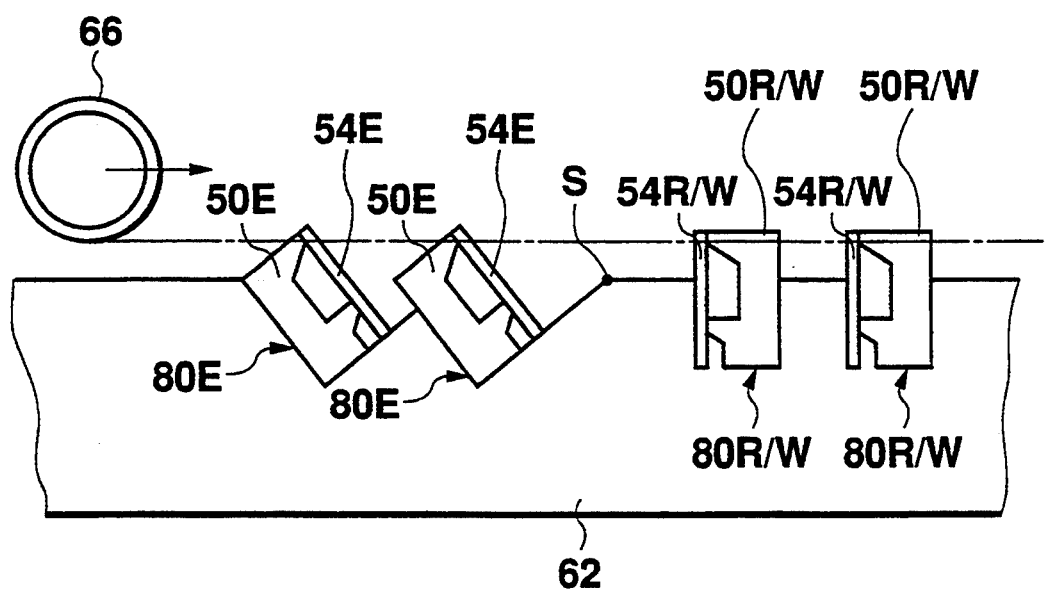
FIG. 29 is an illustration of a step of track definition groove processing on the combined magnetic head core in FIG. 28.

For track definition groove processing of the erase and record/reproduce core blanks 80E and 80R/W, both the core blanks 80E and 80R/W are set on the jig 62 as shown in FIG. 29. On the left side with the center line of the jig 62 as a boundary, a number of erase core blanks 80E are set on the jig 62 at predetermined intervals with the inner core section 54E of each erase core blank 80E faced toward the center line S and inclined at a predetermined angle. On the right side of the center line of the jig 62 as a boundary, as many record/reproduce core blanks 80R/W as the number of erase core blanks 80E are set on the jig 62 at predetermined intervals with the inner core section 54R/W of each record/reproduce core blank 80R/W facing horizontally toward the center line S.

After the record/reproduce and erase core blanks 80R/W and 80E are thus set on the jig 62, the steps TS1 to TS21 are executed to cut the first to fifth track definition grooves 190E-1, 190R/W-1, 190E-2, 190R/W-2, and 190E-3 with the blade 66. If the blade 66 starts at the side of the outer core section 54E of the erase core blank 80E rather than the record/reproduce core blank 80R/W, missing tracks are less likely to occur.

As described above, in the method of manufacturing the combined magnetic head cores according to the embodiment, for the erase and read/write core structures, the same core members which are opposite to each other are set on the jig and the track definition grooves are cut in the same batch, thus the processing conditions match and the processing time of the first track definition grooves to the fifth track definition grooves is short, during which the temperature of the grinding lubricant of the spindle changes 1° C.-2° C. at most. Since the spindle itself has thermal capacity, during the processing time the spindle hardly expands or contracts as the temperature changes. Thus, the record/reproduce and erase core blanks become the same in cumulative pitch error.

Therefore, when the pitches of the track definition grooves for defining read/write tracks are large, the pitches of the track definition grooves for defining erase tracks also become large; when the pitches of the track definition grooves are small, the pitches of the track definition grooves also become small. If the inner core section of the record/reproduce core structure and the inner core section of the erase core structure are combined to form a combined magnetic head core structure, a misalignment between the center line T1 of the record/reproduce core structure and the center line T2 of the erase core structure is small and lies within the allowable range of 4 $\mu$m; trouble such as an adjacent track erasing a record and the actual recording track width being narrowed can be eliminated.

When the record/reproduce and erase core structures are combined so that their center lines S match as described above, the two combined core structures become substantially the same in pitch error anywhere, thus track definition grooves can be cut even for long (30-mm or longer) core blanks and efficiency of manufacturing combined magnetic head cores can be improved.

[Embodiment 3]

Figure 30:
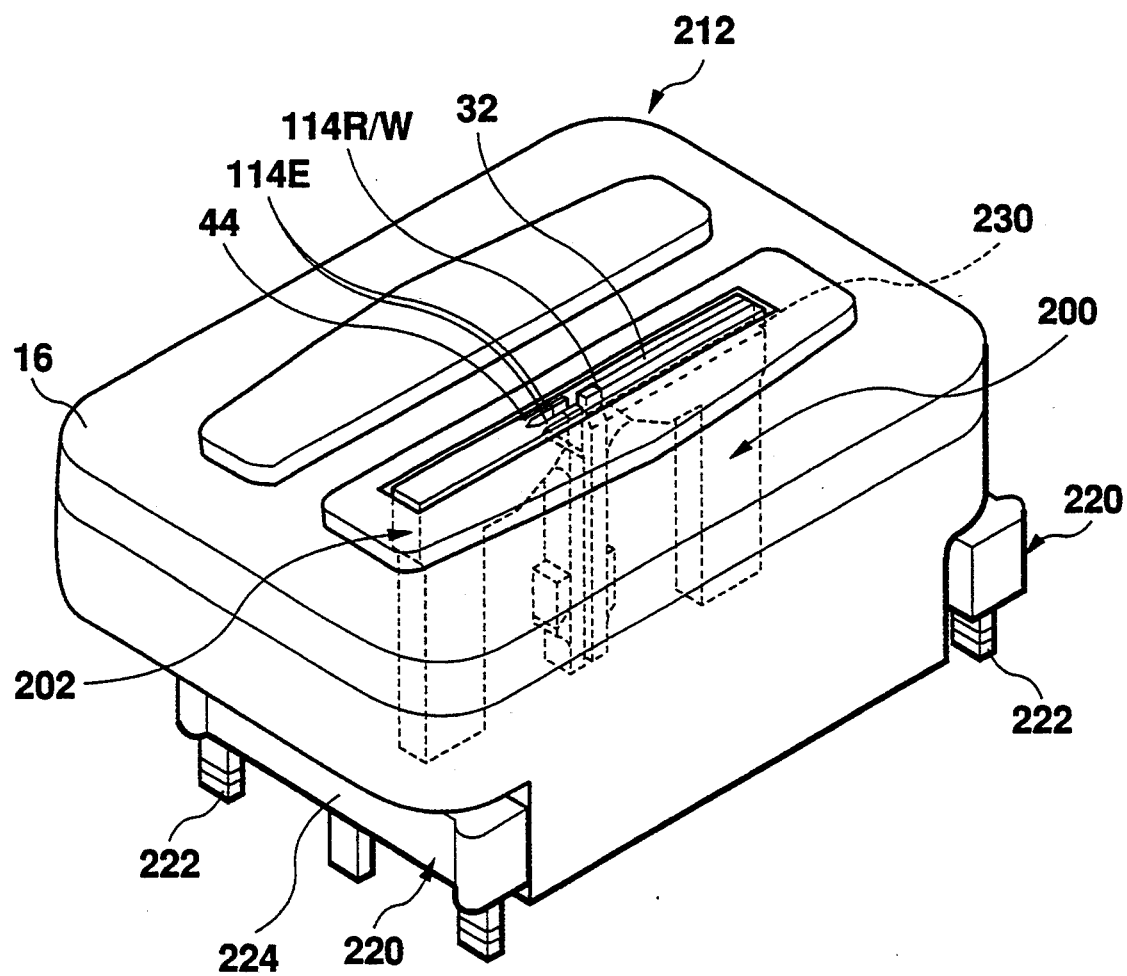
FIG. 30 is a perspective view of a combined magnetic head comprising a combined magnetic head core according to a third embodiment of the invention.
Figure 31:
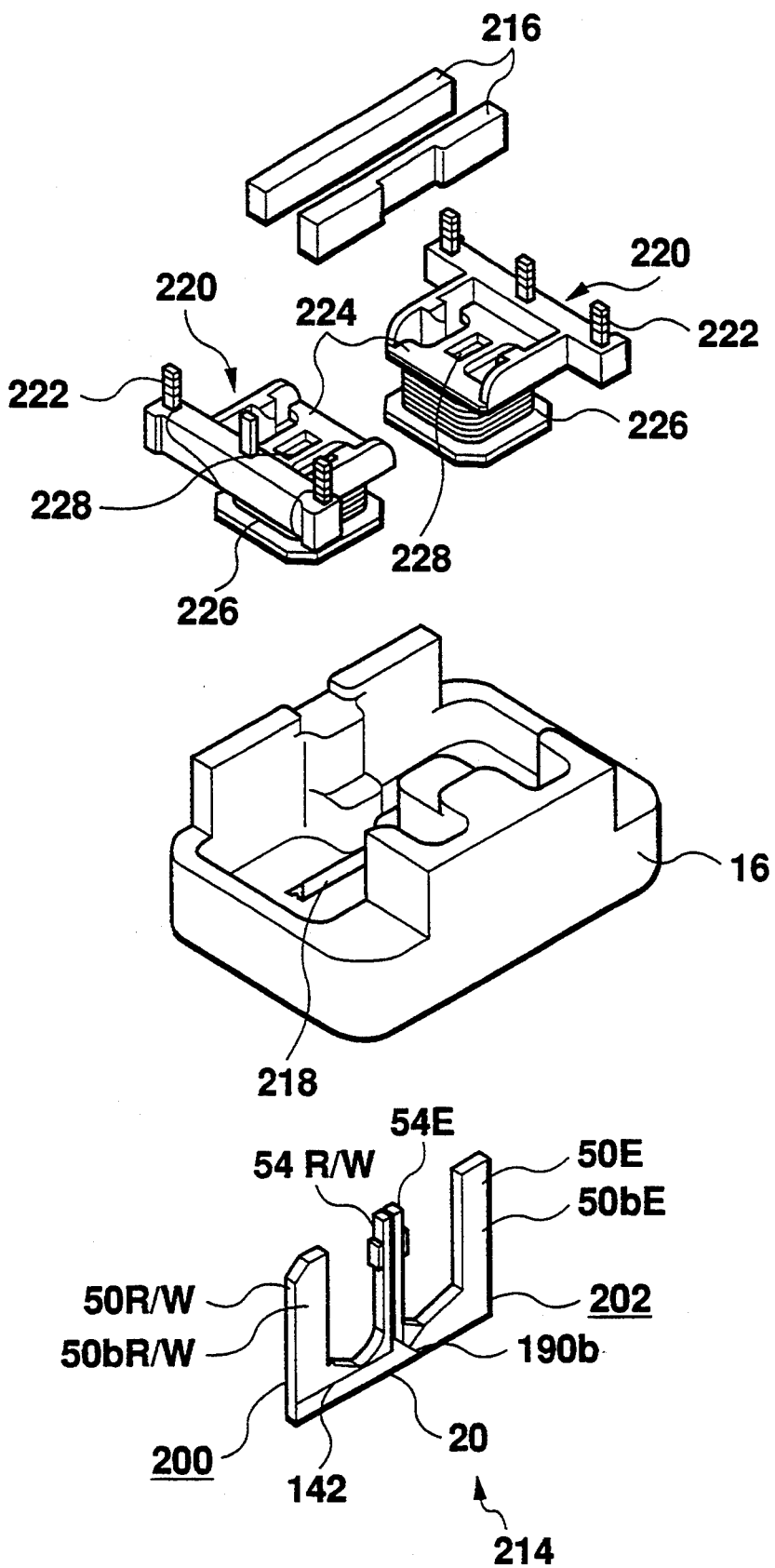
FIG. 31 is an exploded perspective view of the combined magnetic head in FIG. 30 from the rear.
Figure 32:
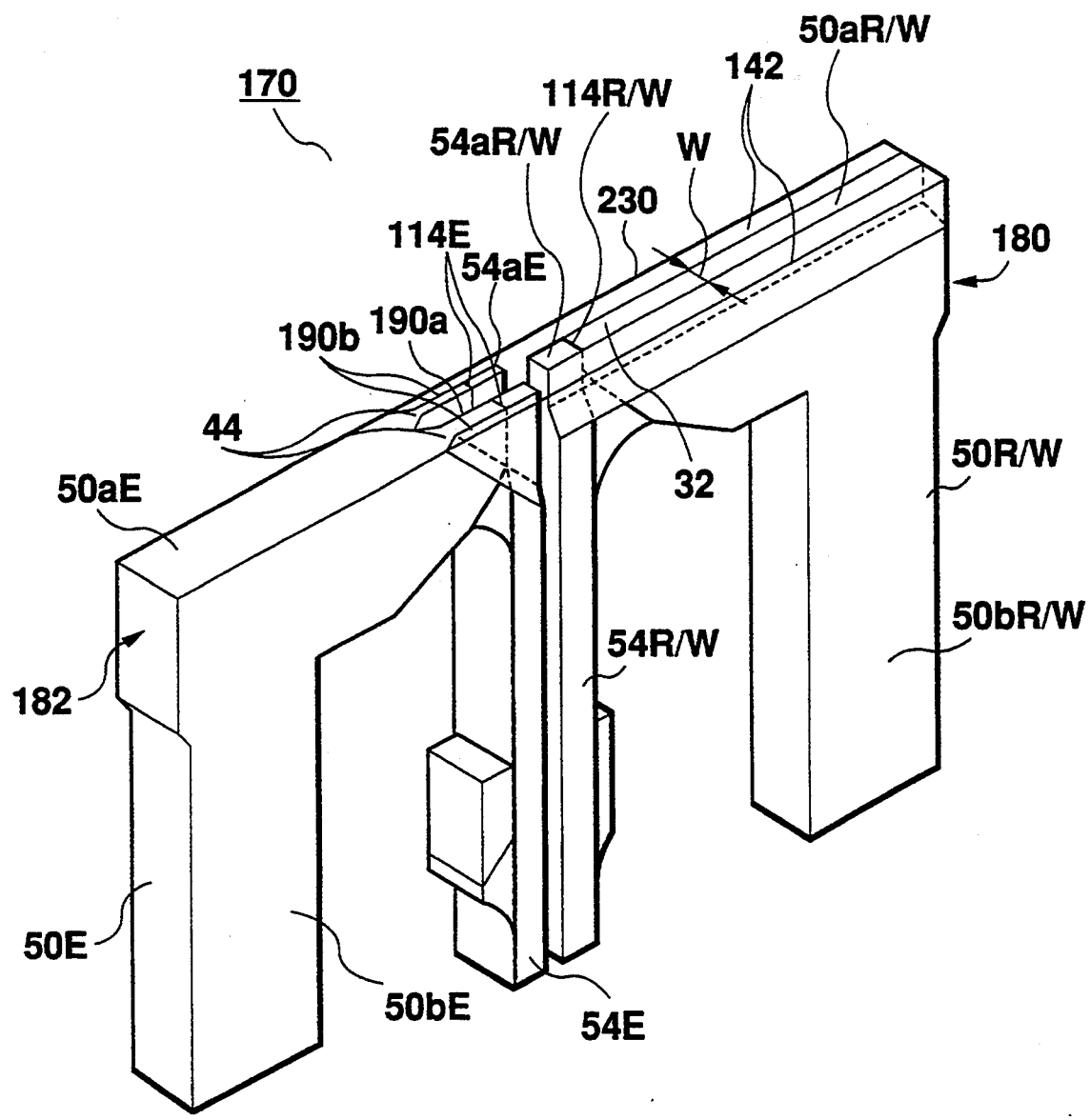
FIG. 32 is a perspective view of the combined magnetic head core according to the third embodiment of the invention.

The forms of the track definition grooves and the processing method therefor shown in the first and second embodiments are described as a third embodiment in conjunction with the accompanying drawings. FIG. 30 is a perspective view of a combined magnetic head comprising a combined magnetic head core according to the third embodiment of the invention. FIG. 31 is an exploded perspective view of the combined magnetic head from the rear. FIG. 32 is a perspective view of the combined magnetic head core according to the third embodiment of the invention.

The combined magnetic head 212 consists mainly of a combined magnetic head core 214, a slider 16, two coil assemblies 220, and two back cores 222. The slider 16, which is a nonmagnetic material, is formed with a core insertion hole 218 on the surface thereof into which the combined magnetic head core 214 is inserted. The coil assembly has a bobbin 224 on which a coil 226 is mounted. An insertion hole 228 is formed at the center of the bobbin 224 and terminals 222 are provided on 45 ends of the bobbin 224. Outer core sections of record-/reproduce and erase cores (described below) of the combined magnetic head core 214 are inserted into the insertion hole 228.

The combined magnetic head 212 is held by a gimbal plate spring (not shown) and FPC (not shown) is connected to the terminals 222.

The combined magnetic head core 214 is a bulk type tunnel erase head and comprises a record/reproduce core (read/write core) 200 and an erase core 202 which are mainly made of MnZn ferrite material.

The record/reproduce core 200 has an outer core section 50R/W and an inner core section 54R/W. The outer core section 50R/W is made of a ferrite member (first core member) whose side is formed like a letter L; it consists of a contact area 50aR/W with which magnetic recording media are brought into contact and a coil core 50bR/W inserted into the insertion hole 228 of the bobbin 224 of the coil assembly 220. The inner core section 54R/W is made of a ferrite member (second core member) whose side is formed like a letter I; it has a contact area 54aR/W on one side, like the outer core section 50R/W. The outer core section 50R/W and the inner core section 54R/W form a magnetic gap (read/-write gap) 114R/W between the contact areas 50aR/W and 54aR/W. A read/write track 32 for recording and reproducing data on and from magnetic recording media is formed in the contact areas 50aR/W and 54aR/W. The read/write track 32 is determined so that it has a predetermined width (w) according to the type of magnetic recording medium with which it is brought into contact. The track width is defined by track definition grooves 142 formed in both magnetic path sides of the magnetic gap 114R/W, namely, formed in both sides in the axial direction of the magnetic path of the contact areas 50aR/W and 54aR/W. The track definition grooves 142 are linear grooves whose depth is constant in the axial direction, and are formed over the full length of both the contact areas 50aR/W and 54aR/W.

The erase core 202 has an outer core section 50E and an inner core section 54E. The outer core section 50E is made of a ferrite member (first core member) whose side is formed like a letter L; it consists of a contact area 50aE and a coil core 50bE. The inner core section 54E is made of a ferrite member (second core member) whose side is formed like a letter I; it has a contact area 38a on one side, like the outer core section 50E. The outer core section 50E and the inner core section 54E form a magnetic gap (erase gap) 114E between the contact areas 50aE and 54aE. Track definition grooves 190a and 190b are formed obliquely in the axial direction of the magnetic path of the contact areas 50aE and 54aE across the contact areas 50aE and 54aE in the center and both sides of the magnetic path of the contact areas 50aE and 54aE. The magnetic paths in the left and right of the track definition groove 190a form erase tracks 44.

The inner core sections 54R/W and 54E of the record/reproduce core 200 and the erase core 202 are located back to back with a predetermined gap. The gap between the inner core sections 54R/W and 54E, the track definition grooves 142, 190a, and 190b, and the magnetic gaps 114R/W and 114E are filled with glass 230 to protect the read/write track 32 and the erase track 44 so as not to lose the corners of the track definition grooves 142, 190a, and 190b for defining the read/-write track 32 and the erase track 44.

Figure 33:
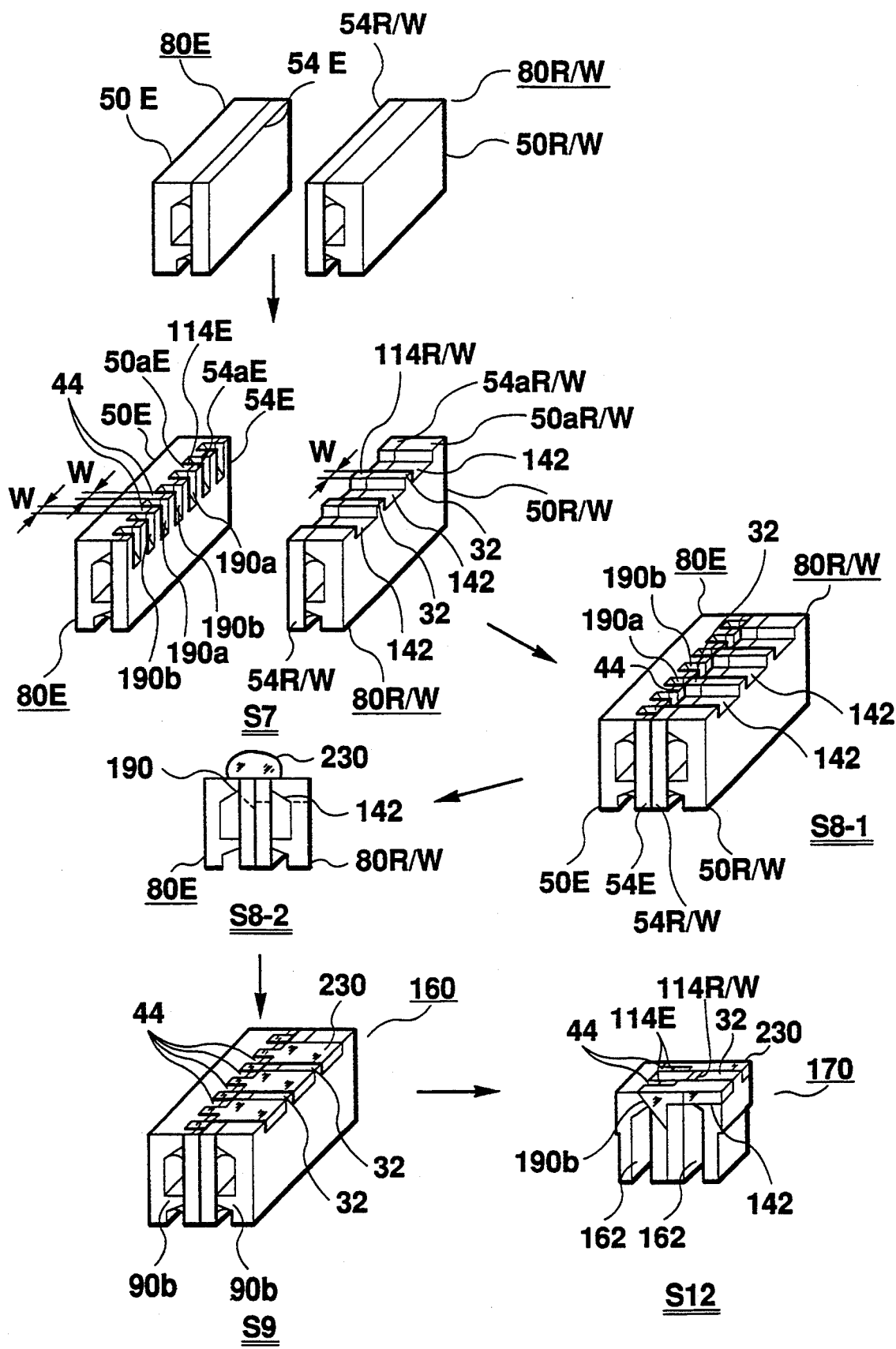
FIG. 33 is an illustration of a process of manufacturing the combined magnetic head core using two core blanks.

A method of manufacturing the combined magnetic head core thus configured is described. FIG. 33 shows a process of manufacturing the combined magnetic head core using two core blanks. Steps and parts identical with or similar to those previously described in the first embodiment and with reference to FIGS. 16 and 17 are denoted by the same reference numerals in the following figures, and will not be discussed again.

The process of manufacturing the combined magnetic head core comprises the steps of "surface groove processing of a first core member (U bar blank) and deposition of a second core member (I bar blank)," "first glass bonding (first GB)," "first GB finishing," "processing of track definition grooves of R/W and E core structures," "second glass bonding (second GB)," "second GB top processing," "coil groove processing," and "core cutting and core chip preparation." The manufacturing method of the combined magnetic head core according to the third embodiment is characterized by the track definition groove processing step in which track definition grooves of R/W and E cores 200 and 202 are processed simultaneously.

At the steps of "surface groove processing of a first core member (U bar blank) and deposition of a second core member (I bar blank)," "first glass bonding (first GB)," and "first GB finishing," as shown in FIG. 17, two types of core blanks 80R/W and 80E each made up of a first core member 50 and a second core member 54 are formed for R/W and E cores. At the step of "second glass bonding (second GB)," as shown in FIG. 33, an R/W core structure 82R/W and an E core structure 82E are combined so that tracks 32 and 44 formed on the R/W and E core structures 82R/W and 82E have a predetermined positional relationship therebetween. As shown in FIG. 33, glass 230 is put on the combined R/W and E core structures 82R/W and 82E and is heated and melted, thereby bonding the two core structures 82R/W and 82E as one piece.

The step of "processing of track definition grooves of R/W and E core structures" is executed as follows:
Track definition grooves of E core structure:

Inclined track definition grooves for defining the track width (w), 190a and 190b, are cut gradually and more shallowly with respect to the contact areas 50aE and 51aE on the PH side of the core blank 80E from the second core member 54E to the first core member 50E, thereby forming track definition grooves parallel to each other and at predetermined intervals (track width (w)). In the center and both side portions of magnetic paths of the contact areas 50aE and 54aE, the track definition grooves 190a and 190b oblique in the axial direction of magnetic paths of the contact areas 50aE and 54aE are formed across both the contact areas 50aE and 54aE. The left and right magnetic paths of the track definition groove 190a become erase tracks 44. As shown in the second embodiment and FIG. 29, the core blank 80E is set obliquely on the jig, then the track definition groove processing is performed by moving the rotating blade 66.

In other words, with respect to the magnetic recording medium contact areas 50aE and 54aE where magnetic gap 114E of the core blank 80E is positioned, the inclined track definition grooves 190a and 190b extend from the second core member 54E to the first core member 50E between which the magnetic gap 114E is put, and are inclined with the depth gradually becoming more shallow toward the first core member 50E; one end of each groove is opened to the side of the second core member 54E and the other end is opened onto the contact face 50aE, the surface on the PH side of the first core member 50E.

Figure 34:
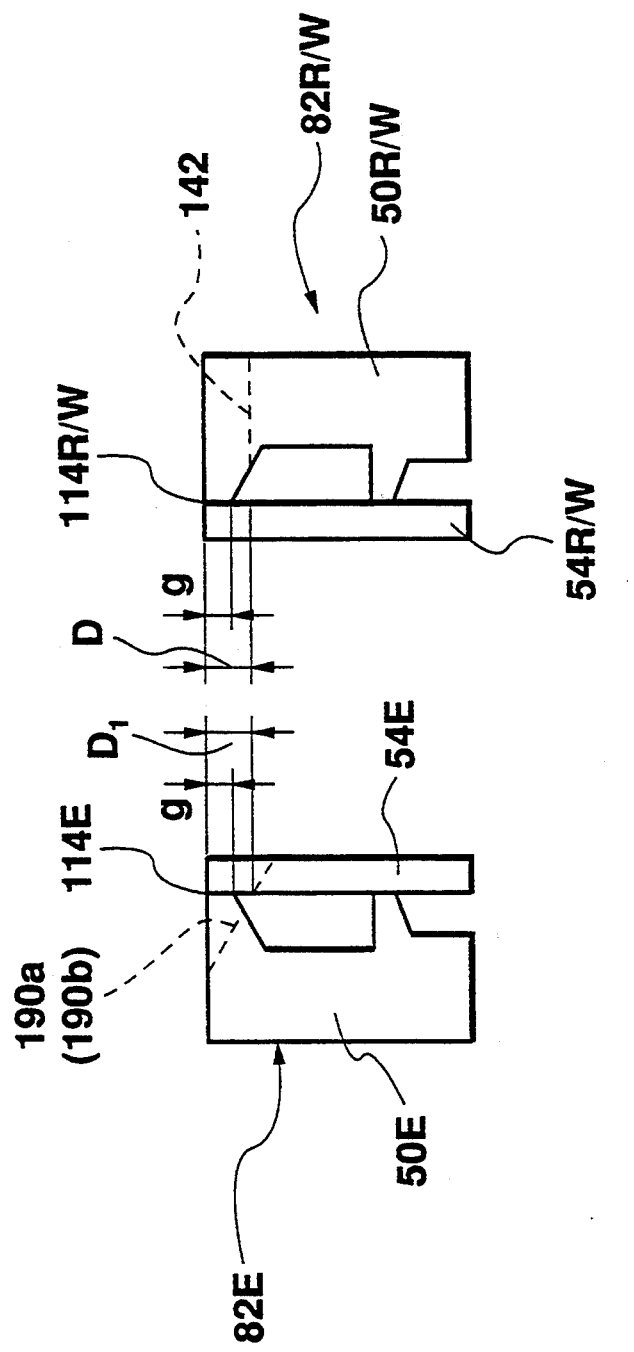
FIG. 34 is a side view of two core structures where groove processing has been performed.

FIG. 34 shows erase and record/reproduce core structures 82E and 82R/W where groove processing has been performed. The inclined track definition groove 190a (190b) on the core structure 82E must have groove depth D1 deeper than magnetic gap depth g in the magnetic gap 114E because if D1 is smaller than g, the width of the erase track 44 is not narrowed by forming the inclined track definition groove 190a (190b). The inclination of the track definition groove 190a (190b) is appropriately determined by factors such as the depth of the magnetic gap 114E, g, and the thickness of the first and second core members 50E and 54E (magnetic path depth). Track definition grooves of R/W core structure:

As shown in FIG. 33, the first core member 50R/W and the second core member 54R/W form a magnetic gap (read/write gap) 114R/W between the contact areas 50aR/W and 54aR/W. A read/write track 32 for recording and reproducing data on and from magnetic recording media is formed in the contact areas 50aR/W and 54aR/W.

The read/write track 32 is determined so that it has a predetermined width (w) according to the type of magnetic recording medium with which it is brought into contact. The track width is defined by track definition grooves 142 formed in both magnetic path sides of the magnetic gap 114R/W, namely, formed in both sides in the axial direction of the magnetic path of the contact areas 50aR/W and 54aR/W. The track definition grooves 142 are linear grooves whose depth D is constant in the axial direction, and are formed over the full length of both the contact areas 50aR/W and 54aR/W. As shown in FIG. 29, after the R/W core blank 80R/W is set horizontally on the jig 62, the track definition grooves 142 are cut by moving the rotating blade 66. The track definition groove 142 on the core blank 80R/W must have groove depth D deeper than magnetic gap depth g in the magnetic gap 114R/W.

The track definition grooves of the read/write and erase cores may be formed on the same jig at the same time as shown in the second embodiment.

The second glass bonding step is executed as described below:
Second glass bonding (GB):

A combined core structure 160 is formed by using the read/write and erase core structures 82R/W and 82E where the groove processing has been performed. The core structures 82R/W and 82E are combined with a predetermined gap between them so that their second core members 54R/W and 54E are put back to back (opposite to each other). The gap between the core structures 82R/W and 82E is a gap into which glass for bonding the core structures penetrates to form a center shield portion. By combining the two core structures 82R/W and 82E, the inclined track definition grooves 190a and 190b and the horizontal track definition grooves 142 formed on the structures 82R/W and 82E are located opposite to each other with a predetermined positional relationship. In this case, the core structures are combined so that the erase tracks 44 of the core structure 82E of the erase core are placed in a zigzag fashion with respect to the read/write tracks 32 of the record/reproduce core 200.

Heat-resistant inorganic adhesive such as aron ceramics is applied to the ends of the second core members 54R/W and 54E of the two core structures 82R/W and 82E thus combined. Glass 230 is put on the formation portions of the inclined track definition grooves 190a and 190b and horizontal track definition grooves 142, and is heated and melted into the track definition grooves 190a, 190b, and 142 formed on the core structures 82R/W and 82E and also penetrates into the gap between the core structures 82R/W and 82E to bond them as one piece, thereby bonding the two core structures 82R/W and 82E and melting the glass 230 into the track definition grooves 190a, 190b, and 142 at the same time.

Second GB top processing:

The top of the combined core structure 160 provided by bonding the two core structures 82R/W and 82E as one piece is ground.

Coil groove processing:

For the combined core structure 160 whose top has been ground, second projections 90b are cut with a multigrinder to form coil grooves 162.

Core cutting and core chip preparation:

The combined core structure 160 where the coil grooves 162 are formed is cut with cutting means such as a blade (diamond cutter) lengthwise to a predetermined length, in other words, so as to contain one set of the read/write and erase tracks 32 and 44 for cutting out combined core chips 170. A lap processing step is executed for the left and right ends of each of the cut-out combined core chips 170.

Completion of magnetic head core:

The combined core chip 170 thus formed is inserted into the core insertion hole 218 of the slider 16, then molded with glass. For the combined core chip 170, the magnetic recording medium contact areas 50aR/W, 50aE, 54aR/W, and 54aE where the magnetic gaps 114R/W and 114E are positioned are finished to forms which magnetic recording media can be efficiently brought into contact with.

Figure 35:
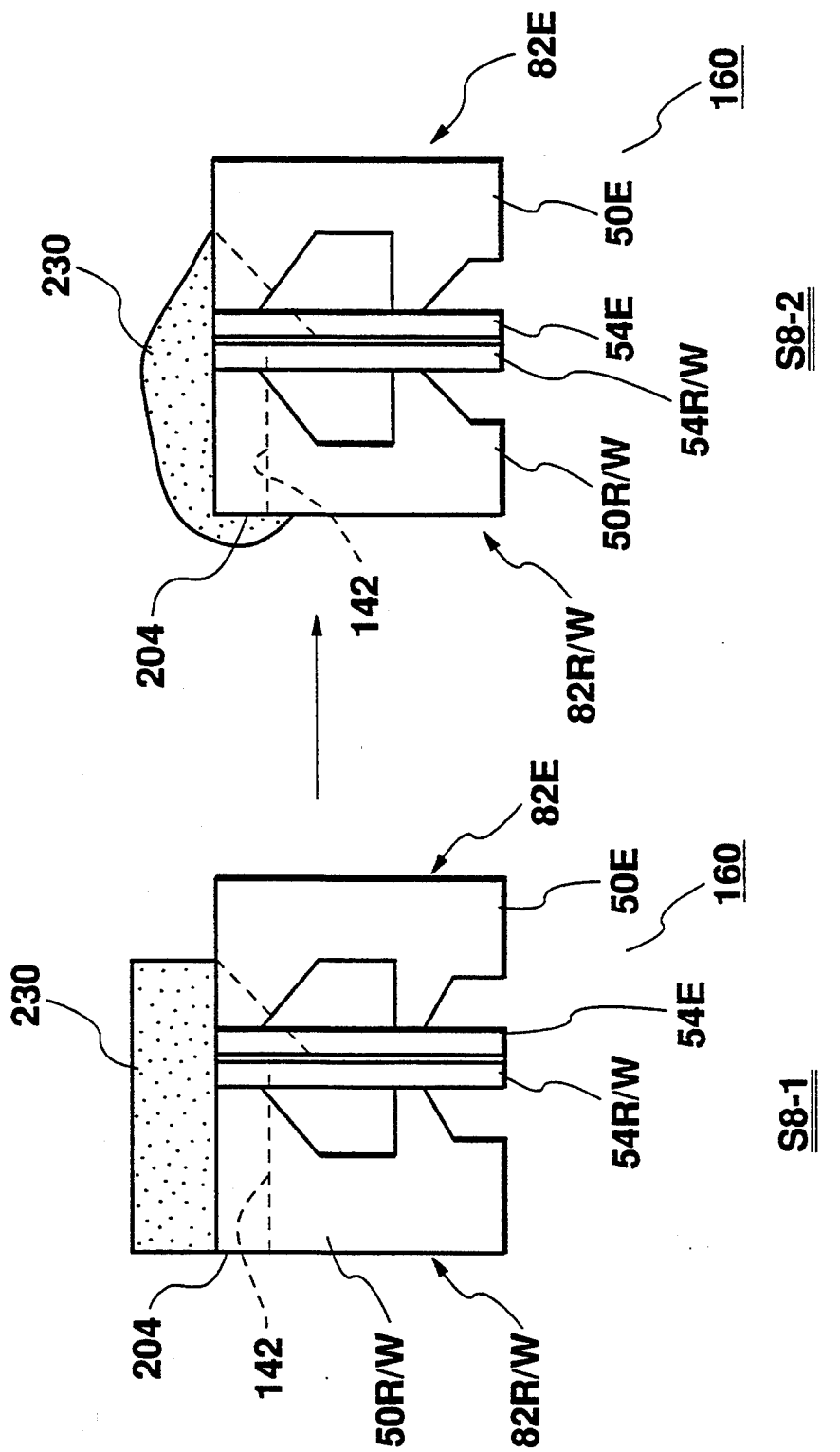
FIG. 35 is a side view of the combined core structure showing the state of the second glass bonding.

FIG. 35 is a front view of the combined core structure 160 showing the state of the second glass bonding step (S8) in FIG. 16; the initial state of the bonding is shown in S8-1 and the state in which glass 230 melts and a part of it drops is shown in S8-2. If the track definition grooves 142 formed in the track definition groove processing step for the record/reproduce core structure 82R/W in the manufacturing method described above are horizontal, when the glass 230 melts as shown in FIG. 35, a part of it drops along the side 204 of the record/reproduce core structure 82R/W, thus the end 204 cannot be used as positioning reference. Use of the end 204 as positioning reference requires an additional step.

However, if the edge of the record/reproduce core structure 82R/W is tight or flat or put up over all the lengthwise range, the interfacial tension between the glass 230 and the record/reproduce core structure 82R/W prevents a part of the glass 230 from dropping along the end 204. If the edge is broken and its angle becomes obtuse, there is a chance that a part of the glass 230 will drop along the end 204.

A method of preventing the glass 230 from dropping is described.

Assuming that the surface tension between ferrite and glass is $\gamma$, the surface tension $\gamma$ is a force acting in the direction for preventing the glass 230 from dropping along the end 204. On the other hand, a force by which the glass 230 is dropped along the end 203 is weight mg of the glass 230. Thus, the greater the weight mg, the greater the chance of dropping the glass 230. The surface tension $\gamma$ is proportional to temperature according to Eötvös law which indicates the relationship between the surface tension and temperature of a liquid, and $$\gamma(M/\rho)$$

where $\gamma$ is the surface tension, M is the molar weight, $\rho$ is the density, T is the absolute temperature, Tc is the substance critical temperature, and k is a constant. Thus, the higher the temperature, the greater the chance of dropping the glass 230.

Figure 36:
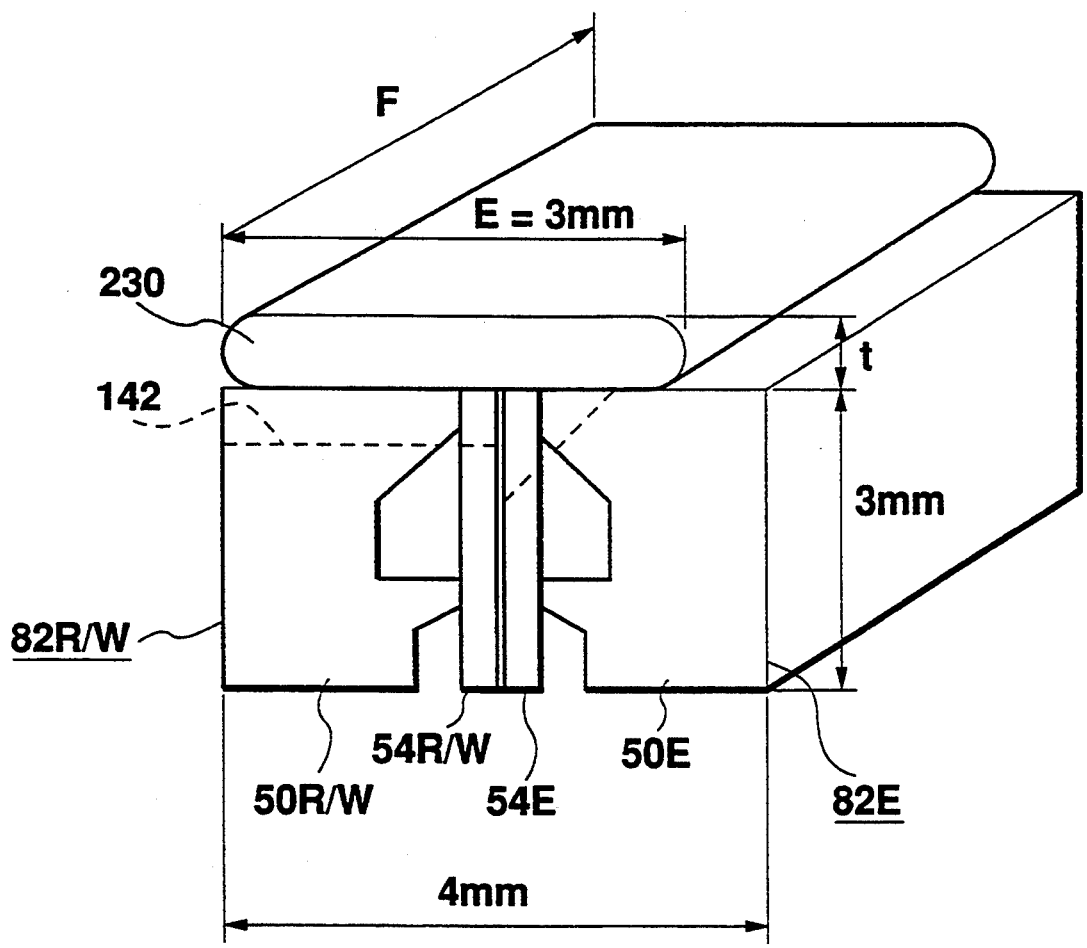
FIG. 36 is an illustration for showing the experimental conditions for preventing glass from dropping.
Figure 37:
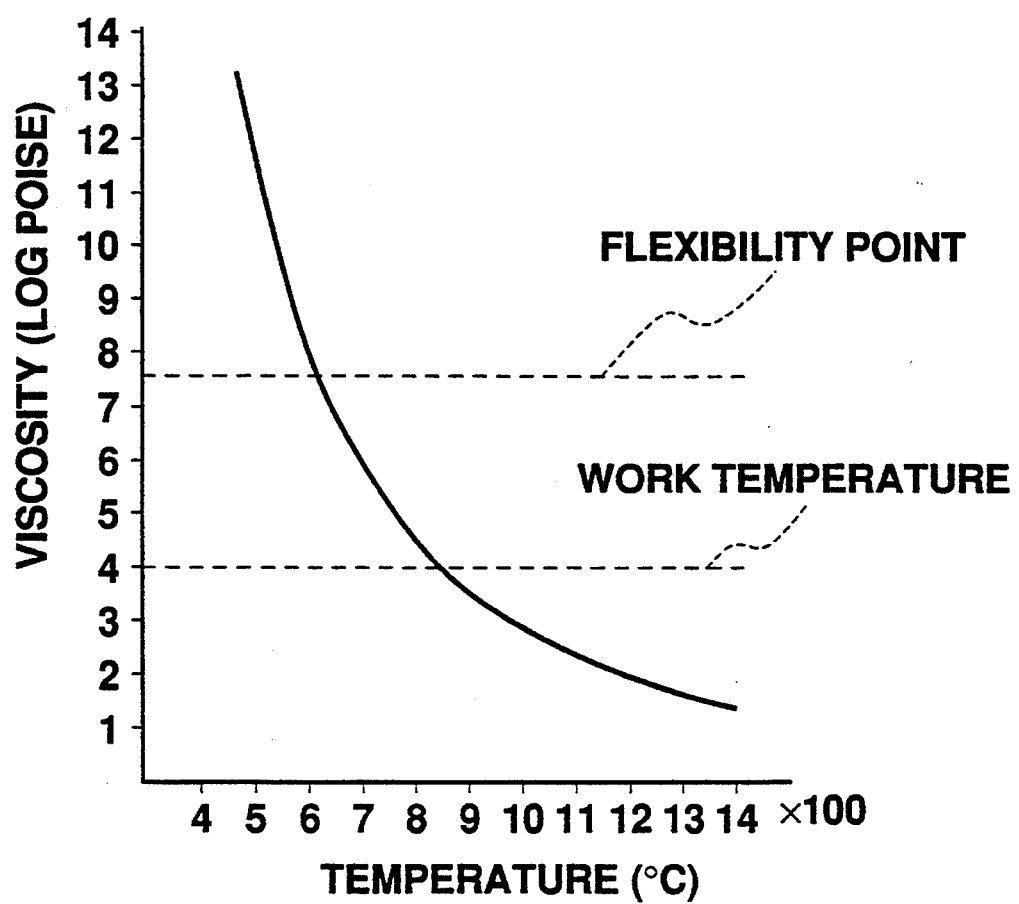
FIG. 37 is a graph showing a viscosity characteristic of glass.
Figure 38:
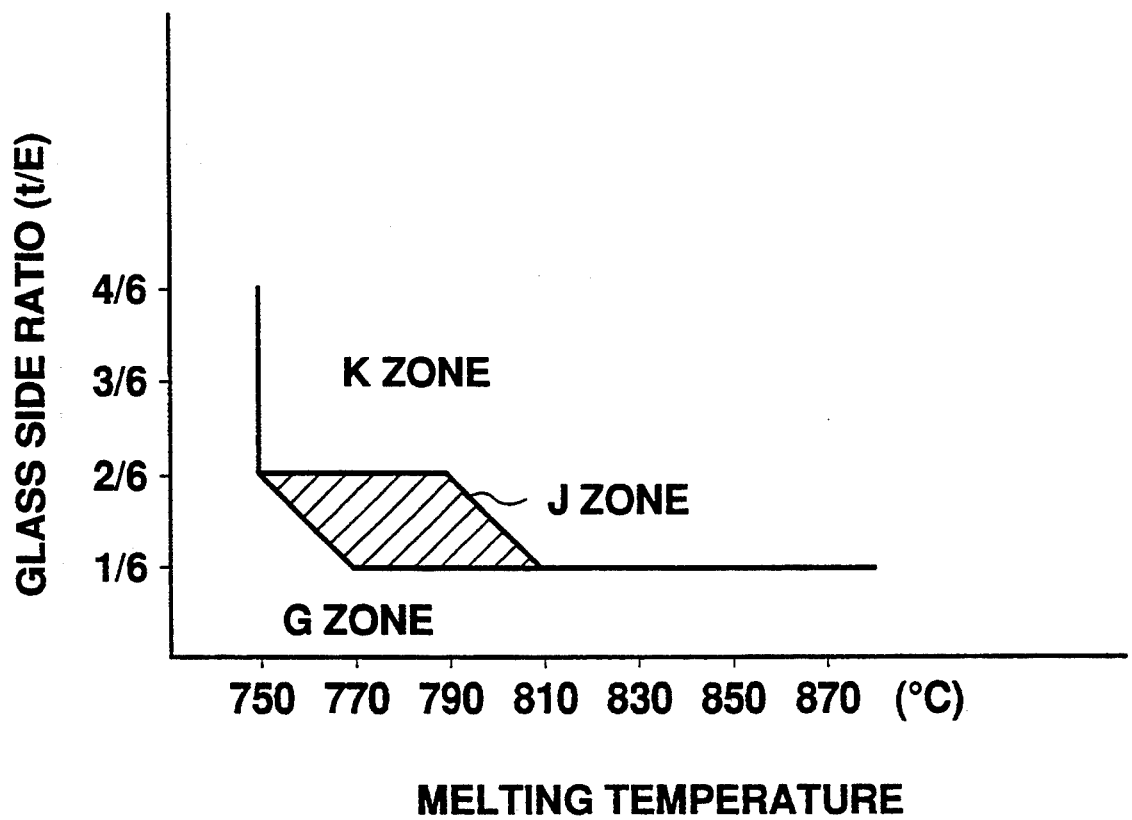
FIG. 38 is a graph showing the relationship between the side ratio and melting temperature of glass.

Experimental conditions:

FIG. 36 is an illustration for showing the experimental conditions for preventing the glass from dropping. FIG. 37 is a graph showing a viscosity characteristic of glass. FIG. 38 is a graph showing the relationship between the side ratio and melting temperature of glass. As shown in FIG. 36, the dimensions (E×t×F) of the glass used for the experiment were 3×0.5×F mm, 3×1×F mm, 3×1.5×F mm, 3>2×1 F mm.

The experiment was made at temperatures of 750°C., 770° C., 790° C., 810° C., 830° C., 850° C., 870° C., and 890° C. by using the glass 230 having such nature as

| Tg | 500° C. | glass transition point | $10^{14.5}$ | poise |
|---|---|---|---|---|
| Tc | 550° C. | yield point | $10^{13}$ | poise |
| Ts | 620° C. | flexibility point | $10^{7.6}$ | poise |
| $\alpha$ thermal expansion coefficient | | | $93 \times 10^{-7}$/°C. | | with constituents of SiO: 38.4, $Al_2O_3$: 13.8, $Fe_2O_3$: 4.6, $B_2O_3$: 25.8, $Na_2O$: 7.1, $K_2O$: 8.3, CaO: 2.0 wt (weight) percentage. The viscosity curve of the glass resulting from the temperatures in the experiment is as shown in FIG. 37. FIG. 38 shows the relationship between the side ratio and melting temperature of the glass, wherein the track definition grooves 142, magnetic gap 114R/W, etc., are filled with insufficient glass 230 in the G zone; the glass 230 drops along the end 204 in the K zone; and in the J zone (hatched region), the track definition grooves 142, magnetic gap 114R/W, etc., are filled with sufficient glass 230 which does not drop along the end 204.

Therefore, the experiment shows that the glass 230 does not drop along the end 204 by selecting the J zone (in which the glass 230 side ratio (t/E) is 1/6 to 2/6 and the glass 230 melting temperature ranges from 750°C. to 810° C.) for the side ratio and melting temperature of the glass 230.

Figure 39:
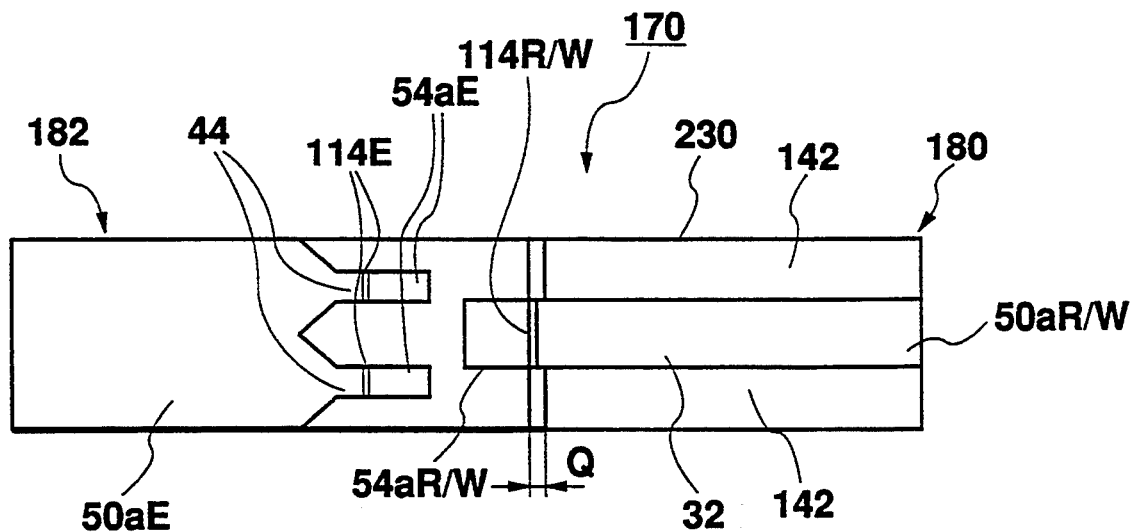
FIG. 39 is a plan view of combined magnetic head core chip according to an embodiment of the invention.
Figure 40:
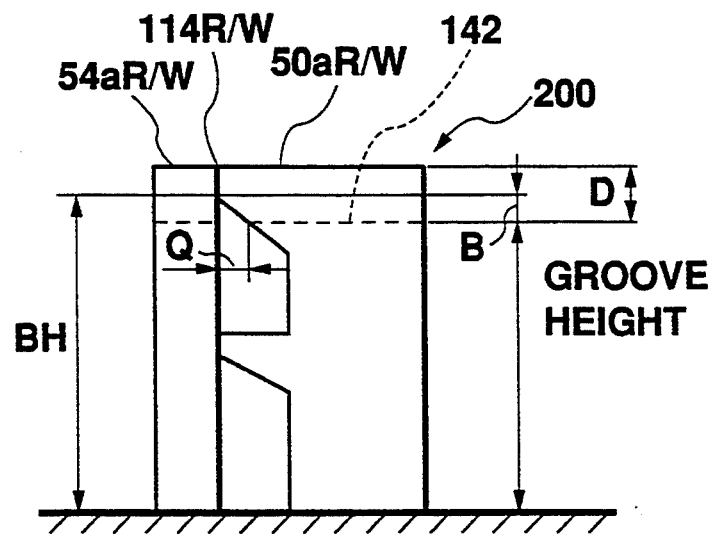
FIG. 40 is a side view of record/reproduce core of the combined magnetic head core according to an embodiment of the invention.

FIG. 39 is a plan view of the combined magnetic head core chip 170 for describing the function. FIG. 40 is a side view of the record/reproduce core 200. In the embodiment, magnetic gap 114R/W is formed between contact areas 50aR/W and 54aR/W of first and second core members 50R/W and 54R/W of the record/reproduce core 200, and linear track definition grooves 142 whose depth D is constant in the axial direction of the magnetic path of the contact areas 50aR/W and 54aR/W are formed in both sides in the axial direction of the magnetic path of the contact areas 50aR/W and 54aR/W across the contact areas 50aR/W and 54aR/W over the full length in the axial direction of the contact areas 50aR/W and 54aR/W, thereby forming read/-write track 33. Thus, as shown in FIG. 40, the B dimension (BH - groove height) is small and even and magnetic resistance R is also even; the read/write characteristic becomes good. The precision of the magnetic gap depth of the erase core may be more than twice as rough compared with that of the magnetic gap depth of the record/reproduce core, thus inclined track grooves are sufficient for the erase core.

As shown in FIG. 40, the track definition groove 142 is a linear, horizontal groove whose depth D is constant, thus the groove depth precision and the workpiece contact face precision with a jig become good. Also, the core structure 82R/W which abuts glass on a simple face becomes good in stability and the bottom of the track definition groove 142 is horizontal, thus the inside of the glass 230 is visible and gap cutoff part dimension Q is visible, as shown in FIG. 39.

If the edge of the core member is broken, a signal is read, thus noise occurs. The linear track definition grooves 142 formed over the full length in the axial direction of the both contact areas 50aR/W and 54aR/W are filled with glass 230, and even if the glass 230 contains process chipping, noise is not read, thus the processing speed can be raised.

Since the glass 230 is disposed over the full length of the record/reproduce core 200 as well as in the neighborhood of the magnetic gap 114R/W of the record/reproduce core 200 and the magnetic gap 114E of the erase core 202, recessing only in the neighborhood of the magnetic gaps 114R/W and 114E does not occur and spacing loss becomes small and lowering of the read/write characteristic can be prevented.

Since the record/reproduce core 200 and the erase core 202 differ in the form of their track definition grooves 142, 190a, 190b, the positions of the record/reproduce core 200 and the erase core 202 become easy to see, improving ease of assembly.

As described above, with the combined magnetic head core according to the embodiment, the magnetic gap is formed between contact areas of first and second core members of the record/reproduce core, and linear track definition grooves whose depth is constant in the axial direction of the magnetic path of the contact areas are formed in both sides in the axial direction of the magnetic path of the contact areas across the contact areas over the full length in the axial direction of the contact areas, thereby forming read/write track. Thus, the B dimension (BH - groove height) is small and even and magnetic resistance is also even; the read/write characteristic becomes good. The track definition grooves are linear grooves whose depth D is constant, thus the groove depth precision and the workpiece contact face precision with a jig become good. The R/W core structure which abuts glass on a simple face becomes good in stability. Also, the inside of the glass is visible and gap cutoff part dimension Q is visible. If the edge of the core member is broken, a signal is read and, thus noise occurs. The linear track definition grooves formed over the full length in the axial direction of both contact areas are filled with glass, and even if the glass contains process chipping, noise is not read, thus the processing speed can be raised.

Since the glass is disposed over the full length of the record/reproduce core as well as in the neighborhood of the magnetic gap of the record/reproduce core and the magnetic gap of the erase core, recessing only in the neighborhood of the magnetic gaps does not occur and spacing loss becomes small and lowering of the read/write characteristic can be prevented.

Since the record/reproduce core and the erase core differ in the form of their track definition grooves, the positions of the record/reproduce core and the erase core become easy to see, improving ease of assembly.

In the method of manufacturing the combined magnetic head core according to the embodiment, the combined magnetic head core provided to the ends described above can be manufactured easily and efficiently.

In the embodiments, the combined magnetic head core using the record/reproduce core and erase core in combination is described, but it can be expected that the technical concept of the invention has a similar effect on a combined magnetic head core using record and reproduce cores in combination.

What is claimed is:

1. In a method of manufacturing a tunnel erase combined magnetic head core comprising the steps of: p1 combining a first core member having a predetermined pole height dimension defined by a surface on a magnetic gap formation side and an apex and a predetermined back height dimension defined by the apex and a bottom of a coil core which is inserted into a coil, and a second core member so that a magnetic gap of a predetermined dimension is formed on said pole height side and forming a core blank by a first glass bonding;

forming track definition grooves of a predetermined depth on a surface on the pole height side of said core blank for forming tracks of a predetermined width and forming a read/write core structure and an erase core structure;

combining said read/write and erase core structures and forming a combined core structure by a second glass bonding; and cutting said combined core structure to a desired thickness to provide combined core chips, the improvement comprising the steps of:

using the bottom of the coil core of said first core member of said core blank as a back height reference face and with the back height reference face as reference, grinding the surface on the pole height side of said core blank;

with the back height reference face of said first core member of said core blank as reference, forming track definition grooves of a predetermined depth on the surface on the pole height side of said core blank for forming tracks of a predetermined width and forming a read/write core structure and an erase core structure;

with the back height reference face of said first core member as reference, combining said read/write and erase core structures and forming a combined core structure by the second glass bonding; and with the back height reference face of said first core member as reference, grinding the surface on the pole height side of said combined core structure.

2. The method as claimed in claim 1 wherein a height dimension of said second core member is smaller than a total height dimension of said first core member and the surface on the back height side of said second core member is located more towards the inside than the back height reference face of said first core member.

3. The method as claimed in claim 1 wherein at least said read/write core structure among said read/write and erase core structures has track definition grooves whose depth from the surface on the pole height side of said read/write core structure is constant for defining a track of a predetermined width.

4. The method as claimed in claim 3 wherein with the back height reference face of said first core member as reference, said read/write and erase core structures are combined and glass with a height to width ratio of between 1:6 and 1:3 is placed on the surface on the pole height side of said two core structures for heating and melting.

5. The method as claimed in claim 4 wherein a melting temperature of said glass ranges from 750° C. to 810° C.

6. In a method of manufacturing a tunnel erase combined magnetic head core comprising the steps of:

combining a first core member having a predetermined pole height dimension defined by a surface on a magnetic gap formation side and an apex and a predetermined back height dimension defined by the apex and a bottom of a coil core which is inserted into a coil, and a second core member so that a magnetic gap of a predetermined dimension is formed on said pole height side and forming a core blank by a first glass bonding;

forming track definition grooves of a predetermined depth on a surface on the pole height side of said core blank for forming tracks of a predetermined width and forming a read/write core structure and an erase core structure;

combining said read/write and erase core structures and forming a combined core structure by a second glass bonding; and cutting said combined core structure to a desired thickness to provide combined core chips, the improvement comprising the steps of:

using the bottom of the coil core of said first core member of said core blank as a back height reference face and with the back height reference face as reference, grinding the surface on the pole height side of said core blank;

with the back height reference face of said first core member of said core blank as reference, placing a read/write core blank on one side of a jig and an erase core blank on the other side of said jig so that they are positioned opposite to each other and forming track definition grooves of a predetermined depth on the surface on the pole height side of said two core blanks for forming tracks of a predetermined width and forming said read/write core structure and said erase core structure;

with the back height reference face of said first core member as reference, combining said read/write and erase core structures and forming a combined core structure by the second glass bonding; and with said back height reference face of said first core member as reference, grinding the surface on the pole height side of said combined core structure.

7. The method as claimed in claim 6 wherein a height dimension of said second core member is smaller than a total height dimension of said first core member and the surface on the back height side of said second core member is located more towards the inside than the back height reference face of said first core member.

8. The method as claimed in claim 6 wherein the track definition grooves of said read/write core structure set on one side of said jig and the track definition grooves of said erase core structure set on the other side are formed consecutively.

9. The method as claimed in claim 6 wherein at least said read/write core structure among said read/write and erase core structures has track definition grooves whose depth from the surface on the pole height side of said read/write core structure is constant for defining a track of a predetermined width.

10. The method as claimed in claim 6 wherein with the back height reference face of said first core member as reference, said read/write and erase core structures are combined and glass with a height to width ratio of between 1:6 and 1:3 is placed on the surface on the pole height side of said two core structures for heating and melting in said second glass bonding.

11. The method as claimed in claim 10 wherein a melting temperature of said glass ranges from 750° C. to 810° C.

12. In a method of manufacturing a tunnel erase combined magnetic head comprising the steps of:

combining a first core member having a predetermined pole height dimension defined by a surface on a magnetic gap formation side and an apex and a predetermined back height dimension defined by the apex and a bottom of a coil core which is inserted into a coil, and a second core member so that a magnetic gap of a predetermined dimension is formed on said pole height side and forming a core blank by a first glass bonding;

forming track definition grooves of a predetermined depth on a surface on the pole height side of said core blank for forming tracks of a predetermined width and forming a read/write core structure and an erase core structure;

combining said read/write and erase core structures and forming a combined core structure by a second glass bonding; and cutting said combined core structure to a desired thickness to provide combined core chips, the improvement comprising the steps of:

using the bottom of the coil core of said first core member of said core blank as a back height reference face and with the back height reference face as reference, grinding the surface on the pole height side of said core blank;

with the back height reference face of said first core member of said core blank as reference, forming track definition grooves of a predetermined depth on the surface on the pole height side of said core blank for forming tracks of a predetermined width and forming a read/write core structure and an erase core structure;

with the back height reference face of said first core member as reference, combining said read/write and erase core structures and forming a combined core structure by the second glass bonding;

with the back height reference face of said first core member as reference, grinding the surface on the pole height side of said combined core structure; and with the back height reference face of said first core member of said combined core chip as reference, combining said combined core chip and a slider and grinding a top of said slider and a surface on the pole height side of said combined core chip for forming a magnetic gap of said combined core chip to a predetermined gap dimension.

13. The method as claimed in claim 12 wherein a height dimension of said second core member is smaller than a total height dimension of said first core member and the surface on the back height side of said second core member is located more towards the inside than the back height reference face of said first core member.

14. The method as claimed in claim 12 wherein at least said read/write core structure among said read/write and erase core structures has track definition grooves whose depth from the surface on the pole height side of said read/write core structure is constant for defining a track of a predetermined width.

15. The method as claimed in claim 12 wherein with the back height reference face of said first core member as reference, said read/write and erase core structures are combined and glass with a height to width ratio of between 1:6 and 1:3 is placed on the surface on the pole height side of said two core structures for heating and melting.

16. The method as claimed in claim 12 wherein a melting temperature of said glass ranges from 750° C. to 810° C.

* * * * *

UNITED STATES PATENT AND TRADEMARK OFFICE
CERTIFICATE OF CORRECTION

PATENT NO.   :   5,428,892
DATED        :   Jul. 4, 1995
INVENTOR(S)  :   MAKATO WAKASUGI

It is certified that error appears in the above-indentified patent and that said Letters Patent is hereby corrected as shown below:

On the title page, item, [73] Assignee, change "Citizen Watch Co., Inc." to —Citizen Watch Co., Ltd.—.

Signed and Sealed this

Twenty-first Day of May, 1996

Attest:

BRUCE LEHMAN

Attesting Officer    Commissioner of Patents and Trademarks